US012223921B2

(12) United States Patent
Liu et al.

(10) Patent No.: US 12,223,921 B2
(45) Date of Patent: Feb. 11, 2025

(54) DRIVE METHOD FOR CONTROLLING DATA VOLTAGE OF DISPLAY PANEL, AND DISPLAY APPARATUS INCLUDING SOURCE DRIVE CIRCUIT FOR CONTROLLING DATA VOLTAGE OF DISPLAY PANEL

(71) Applicants: Wuhan BOE Optoelectronics Technology Co., Ltd., Hubei (CN); BOE Technology Group Co., Ltd., Beijing (CN)

(72) Inventors: Rongcheng Liu, Beijing (CN); Hui Wang, Beijing (CN); Wei Yuan, Beijing (CN); Yanwei Lv, Beijing (CN); Shaohui Li, Beijing (CN); Jiantao Liu, Beijing (CN)

(73) Assignees: Wuhan BOE Optoelectronics Technology Co., Ltd., Hubei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/017,053

(22) PCT Filed: Jan. 10, 2022

(86) PCT No.: PCT/CN2022/071007

§ 371 (c)(1),
(2) Date: Jan. 19, 2023

(87) PCT Pub. No.: WO2023/130444

PCT Pub. Date: Jul. 13, 2023

(65) Prior Publication Data

US 2024/0249693 A1 Jul. 25, 2024

(51) Int. Cl.
*G09G 3/36* (2006.01)

(52) U.S. Cl.
CPC ... *G09G 3/3607* (2013.01); *G09G 2300/0426* (2013.01); *G09G 2320/0285* (2013.01); *G09G 2320/0626* (2013.01)

(58) Field of Classification Search
CPC .................................................. G09G 3/3607
See application file for complete search history.

(56) References Cited

U.S. PATENT DOCUMENTS

2008/0030636 A1 2/2008 Huang et al.
2009/0244463 A1 10/2009 Wang
(Continued)

FOREIGN PATENT DOCUMENTS

CN 101144951 A 3/2008
CN 105467696 A 4/2016
(Continued)

*Primary Examiner* — Chun-Nan Lin
(74) *Attorney, Agent, or Firm* — IPro, PLLC

(57) ABSTRACT

A drive method for a display panel, and a display apparatus. The drive method includes: when current original gray-scale values corresponding to sub-pixels in the same region are the same in a plurality of continuous display frames, converting the current original gray-scale values into a first target gray-scale value and a second target gray-scale value; in a current display frame of the plurality of continuous display frames, controlling a data voltage corresponding to the first target gray-scale value to be input to a first sub-pixel unit in the region, and controlling a data voltage corresponding to the second target gray-scale value to be input to a second sub-pixel unit in the region, where each of the first sub-pixel unit and the second sub-pixel unit includes at least one sub-pixel.

20 Claims, 17 Drawing Sheets

(56) References Cited

U.S. PATENT DOCUMENTS

| | | | | |
|---|---|---|---|---|
| 2010/0134728 | A1 | 6/2010 | Kim et al. | |
| 2012/0019515 | A1* | 1/2012 | Chao | G09G 3/003 345/419 |
| 2014/0103350 | A1 | 4/2014 | Ho et al. | |
| 2014/0267463 | A1 | 9/2014 | Yamakawa | |
| 2017/0162137 | A1 | 6/2017 | Chen et al. | |
| 2017/0205655 | A1 | 7/2017 | Li et al. | |
| 2019/0011751 | A1 | 1/2019 | Chen | |
| 2019/0206341 | A1 | 7/2019 | Liao et al. | |
| 2020/0234634 | A1* | 7/2020 | Li | G09G 3/3208 |
| 2020/0265791 | A1* | 8/2020 | Gao | G09G 3/3696 |
| 2021/0005153 | A1* | 1/2021 | Shan | G09G 3/3677 |
| 2021/0157183 | A1 | 5/2021 | Zhang et al. | |
| 2021/0225302 | A1* | 7/2021 | Huang | G09G 3/3607 |
| 2021/0278731 | A1 | 9/2021 | Long et al. | |
| 2022/0189427 | A1 | 6/2022 | Zhao | |

FOREIGN PATENT DOCUMENTS

| | | | |
|---|---|---|---|
| CN | 106873261 | A | 6/2017 |
| CN | 104821160 | B | 9/2017 |
| CN | 107463040 | A | 12/2017 |
| CN | 107492359 | A | 12/2017 |
| CN | 107895568 | A | 4/2018 |
| CN | 108766347 | A | 11/2018 |
| CN | 109346020 | A | 2/2019 |
| CN | 109671412 | A | 4/2019 |
| CN | 109671411 | B | 10/2020 |
| CN | 112086077 | A | 12/2020 |
| CN | 112835230 | A | 5/2021 |
| CN | 113593491 | A | 11/2021 |
| TW | 200941072 | A | 10/2009 |

* cited by examiner

DRIVE METHOD FOR CONTROLLING DATA VOLTAGE OF DISPLAY PANEL, AND DISPLAY APPARATUS INCLUDING SOURCE DRIVE CIRCUIT FOR CONTROLLING DATA VOLTAGE OF DISPLAY PANEL

The present application is a National Stage of International Application No. PCT/CN2022/071007, filed on Jan. 10, 2022, which is hereby incorporated by reference in its entirety.

FIELD

The present disclosure relates to the technical field of display, and particularly relates to a drive method for a display panel, and a display apparatus.

BACKGROUND

A display such as a liquid crystal display (LCD) generally includes a plurality of pixels. Each pixel may include: a red sub-pixel, a green sub-pixel, and a blue sub-pixel. Display brightness of each sub-pixel is controlled by controlling display data corresponding to the sub-pixel, so as to obtain a mixed display color and then display a color image.

SUMMARY

A drive method for a display panel provided in an example of the present disclosure includes: in a condition that current original gray-scale values corresponding to sub-pixels in the same region are the same in a plurality of continuous display frames, converting the current original gray-scale values into a first target gray-scale value and a second target gray-scale value, where the first target gray-scale value is greater than each of the current original gray-scale values, and the second target gray-scale value is smaller than the current original gray-scale value; in a current display frame of the plurality of continuous display frames, controlling a data voltage corresponding to the first target gray-scale value to be input to a first sub-pixel unit in the region, and controlling a data voltage corresponding to the second target gray-scale value to be input to a second sub-pixel unit in the region, where the at least one first sub-pixel unit and the at least one second sub-pixel unit are adjacent to each other; and each of the first sub-pixel unit and the second sub-pixel unit includes at least one sub-pixel; and in a next display frame of the plurality of continuous display frames, controlling a data voltage corresponding to the second target gray-scale value to be input to the first sub-pixel unit in the region, and controlling a data voltage corresponding to the first target gray-scale value to be input to the second sub-pixel unit in the region.

In some examples, in a row direction and a column direction of sub-pixels, the sub-pixels are repeated in sequence of the first sub-pixel unit and the second sub-pixel unit.

In some examples, in a row direction and a column direction of sub-pixels, the sub-pixels are repeated in sequence of the second sub-pixel unit, the first sub-pixel unit, the first sub-pixel unit, and the second sub-pixel unit.

In some examples, the first sub-pixel unit includes at least two sub-pixels adjacent in the row direction; and the second sub-pixel unit includes at least two sub-pixels adjacent in the row direction.

In some examples, the first sub-pixel unit includes at least two sub-pixels adjacent in the column direction; and the second sub-pixel unit includes at least two sub-pixels adjacent in the column direction.

In some examples, the first sub-pixel unit includes N rows and M columns of sub-pixels, where N is an integer greater than 0, and M is an integer greater than 0; and the second sub-pixel unit includes N rows and M columns of sub-pixels.

In some examples, in the plurality of continuous display frames, polarity corresponding to a data voltage input to each sub-pixel in the first sub-pixel unit and the second sub-pixel unit is controlled to be reversed once after an even quantity of display frames.

In some examples, the converting the current original gray-scale values into a first target gray-scale value and a second target gray-scale value includes: converting the current original gray-scale values with a default gray-scale bit quantity into the first target gray-scale value and the second target gray-scale value each with a target gray-scale bit quantity, where the target gray-scale bit quantity is not smaller than the default gray-scale bit quantity.

In some examples, the converting the current original gray-scale values with the default gray-scale bit quantity into the first target gray-scale value and the second target gray-scale value each with the target gray-scale bit quantity includes: determining the first target gray-scale value and the second target gray-scale value corresponding to the current original gray-scale values from a first pre-stored lookup table according to the current original gray-scale values, where the first lookup table includes: a plurality of different original gray-scale values corresponding to the default gray-scale bit quantity, and a plurality of first different target gray-scale values and a plurality of second different target gray-scale values corresponding to the target gray-scale bit quantity; and in the first lookup table, one original gray-scale value corresponds to one first target gray-scale value and one second target gray-scale value.

In some examples, the display panel includes multiple sub-pixels with different colors; and the first lookup table includes first target gray-scale values and second target gray-scale values corresponding to the multiple sub-pixels with different colors.

In some examples, the converting the current original gray-scale values with the default gray-scale bit quantity into the first target gray-scale value and the second target gray-scale value each with a target gray-scale bit quantity includes: determining a current intermediate gray-scale value corresponding to the current original gray-scale values from a second pre-stored lookup table according to the current original gray-scale values, where an intermediate gray-scale bit quantity of the current intermediate gray-scale value is greater than the default gray-scale bit quantity, and the intermediate gray-scale bit quantity is smaller than the target gray-scale bit quantity; and determining the first target gray-scale value and the second target gray-scale value corresponding to the current intermediate gray-scale value from the second lookup table according to the current intermediate gray-scale value, where the second lookup table includes: a plurality of different original gray-scale values corresponding to the default gray-scale bit quantity, a plurality of different intermediate gray-scale values corresponding to the intermediate gray-scale bit quantity, and a plurality of first different target gray-scale values and a plurality of second different target gray-scale values corresponding to the target gray-scale bit quantity; and in the second lookup table, one original gray-scale value corresponds to one intermediate gray-scale value, and one intermediate gray-scale value corresponds to one first target gray-scale value and one second target gray-scale value.

In some examples, the display panel includes multiple sub-pixels with different colors; and the second lookup table includes first target gray-scale values and second target gray-scale values corresponding to the multiple sub-pixels with different colors.

In some examples, before the converting the current original gray-scale values into a first target gray-scale value and a second target gray-scale value, the drive method further includes: receiving original display data of each sub-pixel in the plurality of continuous display frames; and determining the current original gray-scale value of each sub-pixel in the plurality of continuous display frames according to the original display data of each sub-pixel in the plurality of continuous display frames.

A display apparatus provided in an example of the present disclosure includes: a display panel including a source drive circuit; and a timing controller configured to: convert, in a condition that current original gray-scale values corresponding to sub-pixels in the same region are the same in a plurality of continuous display frames, the current original gray-scale values into a first target gray-scale value and a second target gray-scale value, and output the first target gray-scale value and the second target gray-scale value to the source drive circuit, where the first target gray-scale value is greater than each of the current original gray-scale value, and the second target gray-scale value is smaller than the current original gray-scale value; wherein the source drive circuit is configured to: in a current display frame of the plurality of continuous display frames, control a data voltage corresponding to the first target gray-scale value to be input to a first sub-pixel unit in the region, and control a data voltage corresponding to the second target gray-scale value to be input to a second sub-pixel unit in the region; and in a next display frame of the plurality of continuous display frames, control a data voltage corresponding to the second target gray-scale value to be input to the first sub-pixel unit in the region, and control a data voltage corresponding to the first target gray-scale value to be input to the second sub-pixel unit in the region, where the at least one first sub-pixel unit and the at least one second sub-pixel unit are adjacent to each other; and each of the first sub-pixel unit and the second sub-pixel unit includes at least one sub-pixel.

In some examples, the timing controller is stored with a first lookup table, where the first lookup table includes: a plurality of different original gray-scale values corresponding to a default gray-scale bit quantity, and a plurality of first different target gray-scale values and a plurality of second different target gray-scale values corresponding to a target gray-scale bit quantity; and in the first lookup table, one original gray-scale value corresponds to one first target gray-scale value and one second target gray-scale value.

In some examples, the timing controller is stored with a second lookup table, where the second lookup table includes: a plurality of different original gray-scale values corresponding to a default gray-scale bit quantity, a plurality of different intermediate gray-scale values corresponding to an intermediate gray-scale bit quantity, and a plurality of first different target gray-scale values and a plurality of second different target gray-scale values corresponding to a target gray-scale bit quantity; and in the second lookup table, one original gray-scale value corresponds to one intermediate gray-scale value, and one intermediate gray-scale value corresponds to one first target gray-scale value and one second target gray-scale value.

In some examples, the display panel includes a plurality of sub-pixels; each sub-pixel includes a transistor and a pixel electrode; and the pixel electrode includes: a first edge conductive part and a second edge conductive part that are arranged at an interval in a first direction, and a main conductive part at least partially between the first edge conductive part and the second edge conductive part, wherein the main conductive part is connected to the first edge conductive part and the second edge conductive part separately, the main conductive part includes at least one first group of sub-conductive parts and at least one second group of sub-conductive parts, and the first group of sub-conductive parts and the second group of sub-conductive parts are arranged alternately in the first direction, where the first group of sub-conductive parts includes a first connection strip, and the first connection strip extends in the first direction and has a first face and a second face opposite each other in a second direction; and the first group of sub-conductive parts has a first slit located at one side of the first face away from the second face, and one end of the first slit away from the first connection strip is an open end; and the second group of sub-conductive parts includes a second connection strip located at one side of the first slit away from the first connection strip and connected to the first group of sub-conductive parts, the second connection strip extends in the first direction and has a third face and a fourth face opposite each other in the second direction, and the third face is located at one side of the fourth face close to the first face; and the second group of sub-conductive parts has a second slit located at one side of the third face away from the fourth face, and one end of the second slit away from the second connection strip is an open end.

In some examples, in two adjacent sub-pixels in a row direction or a column direction, in a first sub-pixel, a first edge conductive part is arranged close to a transistor, and a second edge conductive part is arranged away from the transistor; and the second connection strip is close to a second sub-pixel of the two adjacent sub-pixels, and the first connection strip is away from the second sub-pixel; and in the second sub-pixel, a first edge conductive part is arranged away from a transistor, and a second edge conductive part is arranged close to the transistor; and the second connection strip is away from the first sub-pixel of the two adjacent sub-pixels, and the first connection strip is close to the first sub-pixel.

In some examples, in the first sub-pixel and the second sub-pixel, a quantity of second electrode strips in the first sub-pixel connected to the second connection strip is different from a quantity of second electrode strips in the second sub-pixel connected to the second connection strip; and/or, a quantity of first electrode strips in the first sub-pixel connected to the first connection strip is different from a quantity of first electrode strips the second sub-pixel connected to the first connection strip.

In some examples, in the same sub-pixel, the first connection strip is connected to the second connection strip by means of an adapter; and the adapter has a hollowed-out region.

In some examples, the display panel includes a plurality of common electrodes; a row of sub-pixels are provided with one common electrode; the display panel further includes a plurality of bridging parts; and two adjacent common electrodes are electrically connected to each other by means of at least one bridging part.

DETAILED DESCRIPTION OF THE EMBODIMENTS

Figure 1:
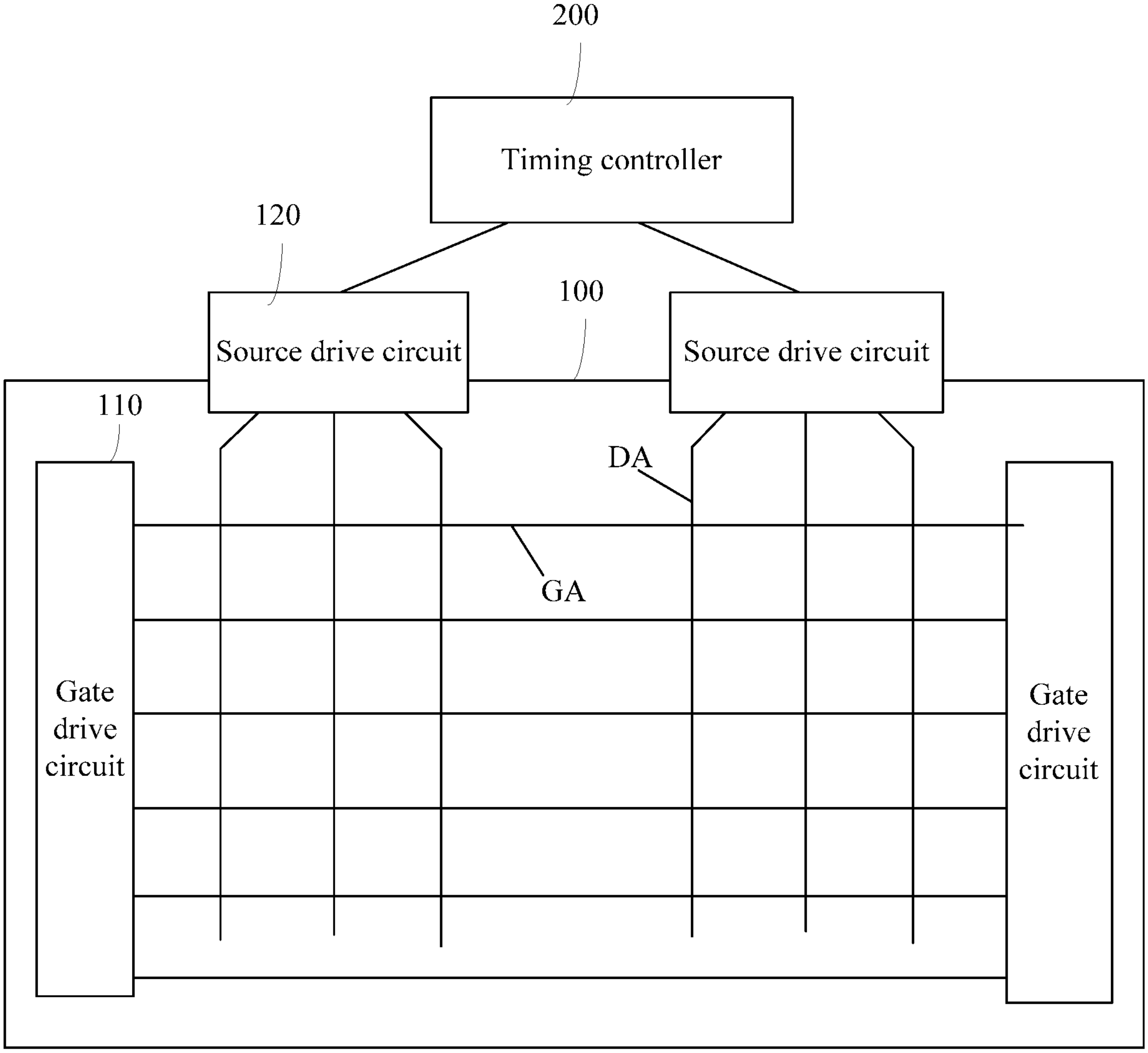
FIG. 1 shows a diagram of some structures of a display apparatus provided in an example of the present disclosure.

In order to make objectives, technical solutions and advantages of examples of the present disclosure clearer, the technical solutions of the examples of the present disclosure will be clearly and completely described below in conjunction with the accompanying drawings in the examples of the present disclosure. Apparently, the examples described are some examples rather than all examples of the present disclosure. The examples in the present disclosure and features of the examples can be combined with each other without conflict. Based on the examples of the present disclosure, all other examples obtained by those of ordinary skill in the art without making creative efforts fall within the scope of protection of the present disclosure.

Unless otherwise defined, technical or scientific terms used in the present disclosure should have ordinary meanings as understood by those of ordinary skill in the art to which the present disclosure belongs. "First", "second", and other similar words used in the present disclosure do not indicate any order, amount or importance, but are only used to distinguish different components. "Including", "comprising", and other similar words indicate that elements or objects before the word include elements or objects after the word and their equivalents, without excluding other elements or objects. "Connecting", "connected", and other similar words are not limited to physical or mechanical connections, but can include electrical connections, which can be direct or indirect.

It should be noted that a size and a shape of each figure in the drawings do not reflect a true scale, but only for illustrating the present disclosure. Throughout the drawings, identical or similar reference numerals denote identical or similar elements or elements with identical or similar functions.

Figure 2:
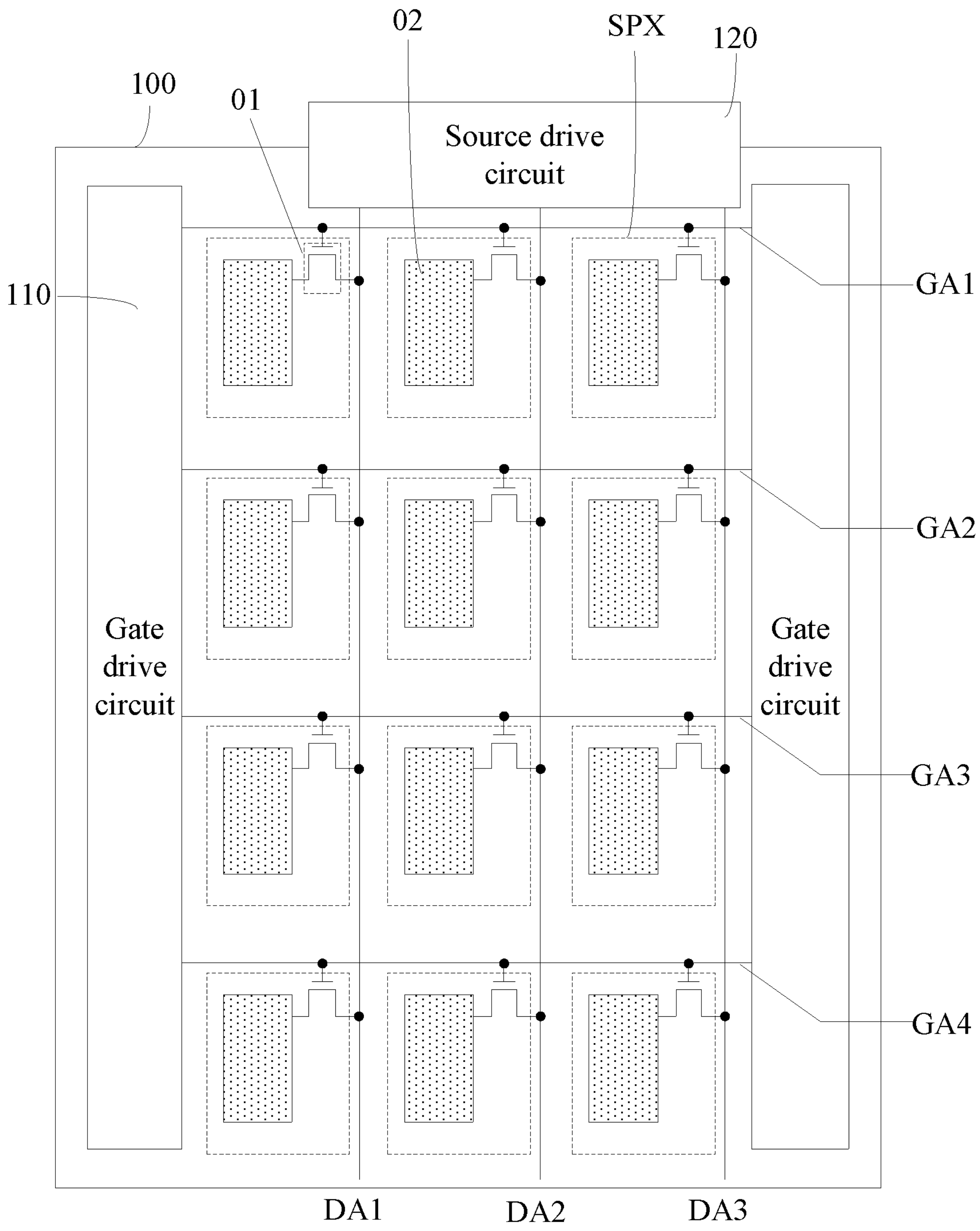
FIG. 2 shows a diagram of some structures of a display panel provided in an example of the present disclosure.

With reference to FIGS. 1 and 2, a display apparatus may include a display panel 100 and a timing controller 200. The display panel 100 may include a plurality of pixel units arranged in an array, a plurality of gate lines GA (for example, GA1, GA2, GA3, and GA4), a plurality of data lines DA (for example, DA1, DA2, and DA3), a gate drive circuit 110, and a source drive circuit 120. The gate drive circuit 110 is coupled to the gate lines GA1, GA2, GA3 and GA4 separately, and the source drive circuit 120 is coupled to the data lines DA1, DA2 and DA3 separately. The timing controller 200 may input a control signal to the gate drive circuit 110 via a level shift circuit, so as to drive the gate lines GA1, GA2, GA3, and GA4. The timing controller 200 inputs a signal to the source drive circuit 120, such that the source drive circuit 120 inputs a data voltage to the data line, so as to charge a sub-pixel SPX, and a corresponding data voltage is input to the sub-pixel SPX, so as to achieve an image display function. For example, there may be two source drive circuits 120, where one source drive circuit 120 is connected to one half of the data lines, and the other one source drive circuit 120 is connected to the other half of the data lines. Certainly, there may be three, four, or more source drive circuits 120, which may be designed and determined according to requirements of practical application, and are not limited herein.

For example, each pixel unit includes a plurality of sub-pixels SPX. For example, each pixel unit may include a red sub-pixel, a green sub-pixel, and a blue sub-pixel, such that red, green and blue colors may be mixed to achieve color display. Alternatively, the pixel unit may include a red sub-pixel, a green sub-pixel, a blue sub-pixel, and a white sub-pixel, such that red, green, blue and white colors may be mixed to achieve color display. Certainly, in practical application, an emitting color of the sub-pixels in the pixel unit may be designed and determined according to an actual application environment, which is not limited herein.

With reference to FIG. 2, each sub-pixel SPX includes a transistor 01 and a pixel electrode 02. A row of sub-pixels SPX correspond to one gate line, and a column of sub-pixels SPX correspond to one data line. A gate electrode of the transistor 01 is electrically connected to a corresponding gate line, a source electrode of the transistor 01 is electrically connected to a corresponding data line, and a drain electrode of the transistor 01 is electrically connected to the pixel electrode 02. It should be noted that a pixel array structure of the present disclosure may further be a double-gate structure, that is, two gate lines are arranged between two adjacent rows of pixels, the arrangement mode may reduce the quantity of data lines by half, that is, there are data lines between some adjacent columns of pixels while there are no data lines between some adjacent columns of pixels. A specific pixel arrangement structure and arrangement modes of the data lines and scanning lines are not limited.

It should be noted that the display panel in the example of the present disclosure may be a liquid crystal display panel. For example, the liquid crystal display panel generally includes an upper substrate and a lower substrate that form a cell, and liquid crystal molecules encapsulated between the upper substrate and the lower substrate. When an image is displayed, there is a voltage difference between a data voltage applied to the pixel electrode of each sub-pixel SPX and a common electrode voltage applied to a common electrode, and an electric field may be formed due to the voltage difference, such that the liquid crystal molecules deflect under the action of the electric field. Due to electric fields with different intensities, deflection degrees of liquid crystal molecules are different, which leads to different transmittance of the sub-pixels SPX, such that the sub-pixels SPX may achieve brightness of different gray scales, and then achieve image display.

Figure 3:
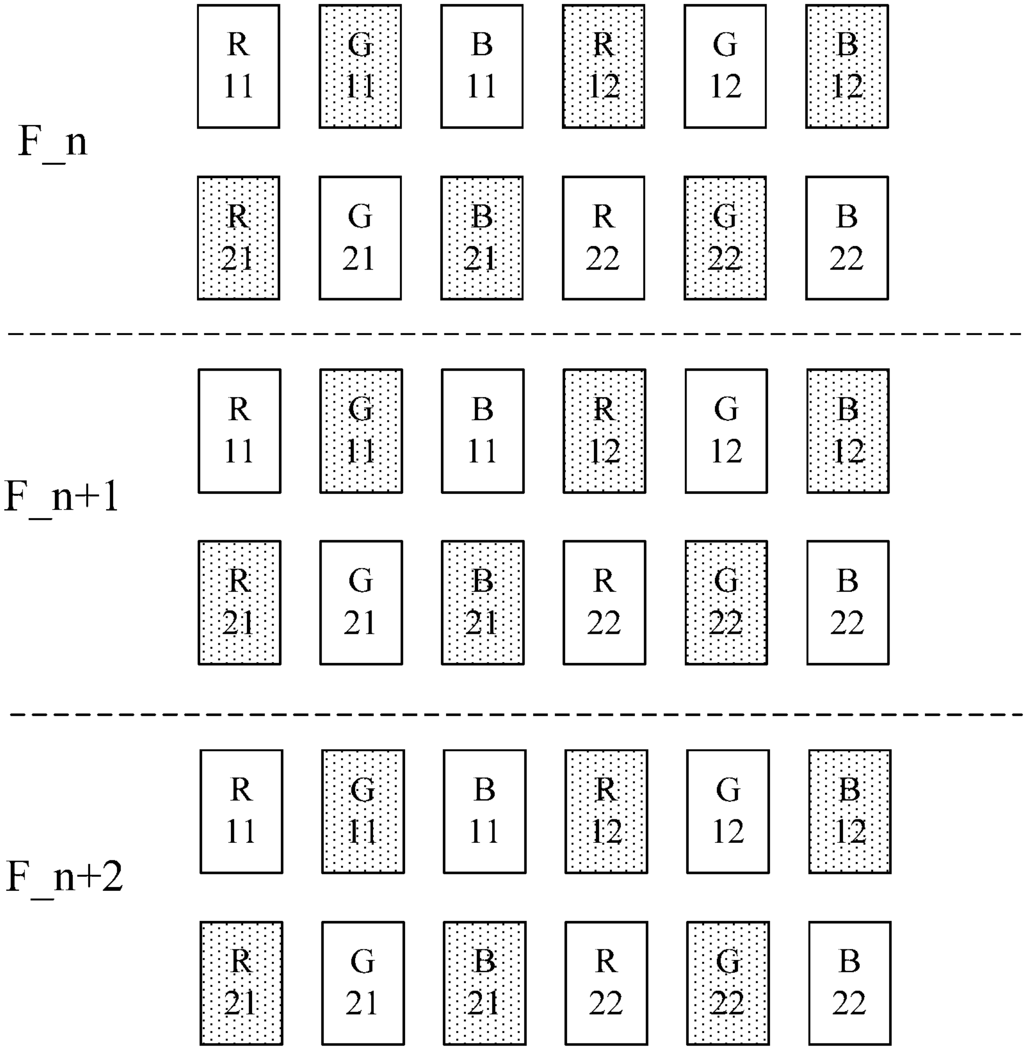
FIG. 3 shows a diagram of some other structures of a display panel provided in an example of the present disclosure.
Figure 4:
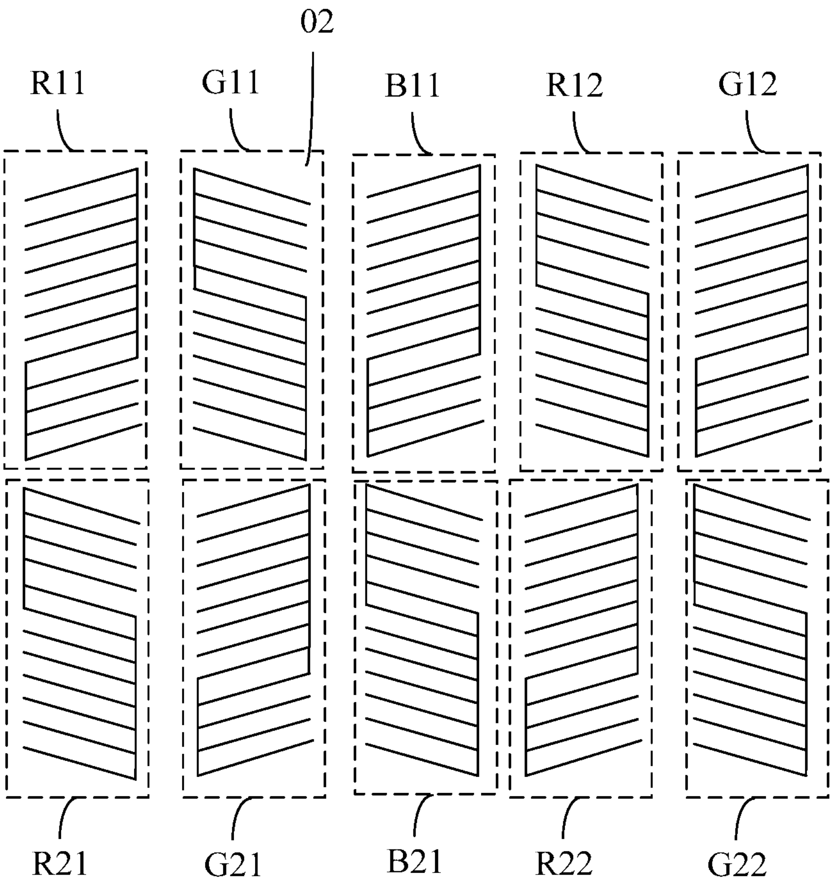
FIG. 4 is a schematic diagram of an equivalent structure of a pixel electrode in a display panel provided in an example of the present disclosure.
Figure 5:
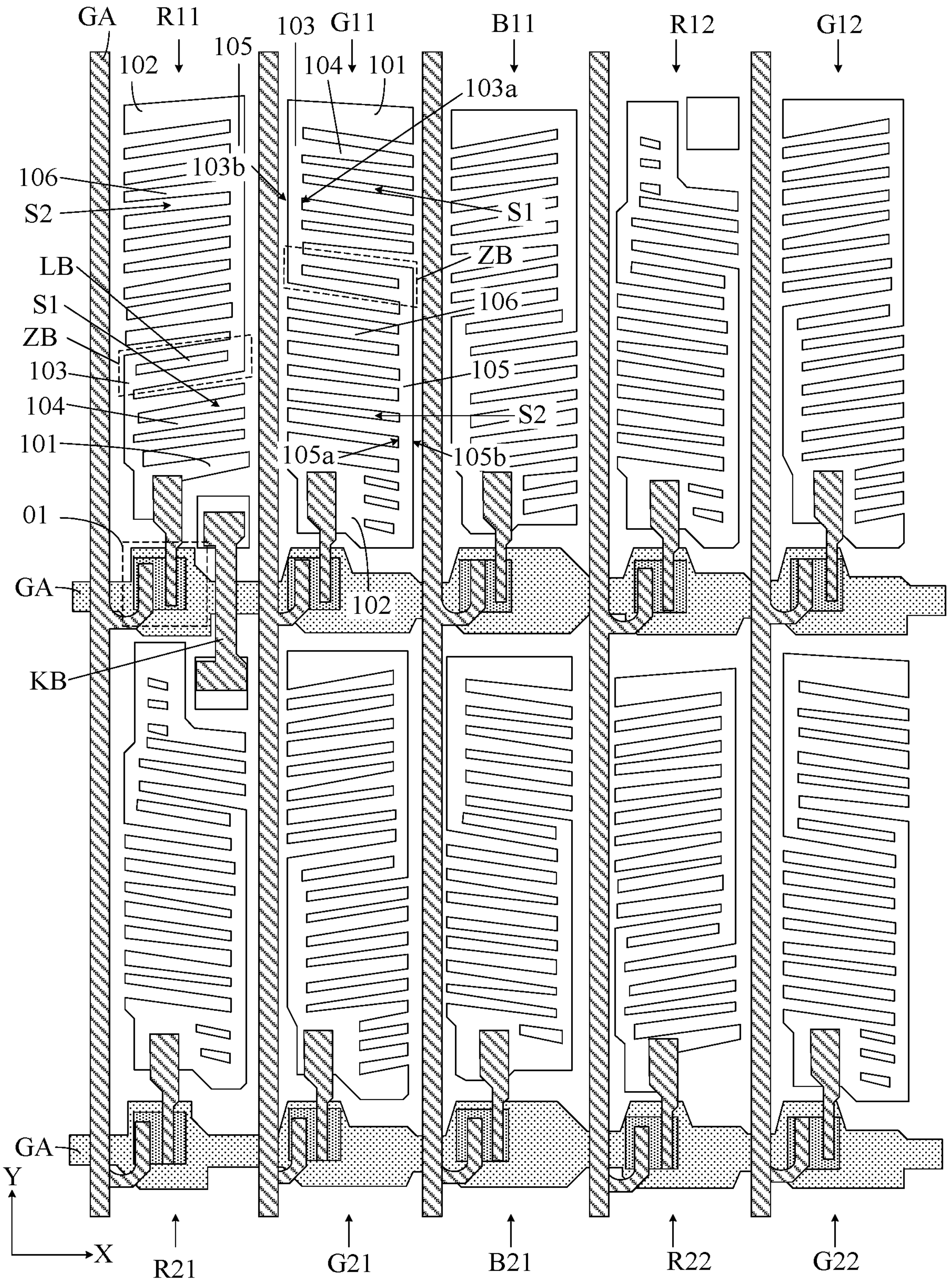
FIG. 5 is a schematic diagram of a specific structure of a pixel electrode in a display panel provided in an example of the present disclosure.

In the example of the present disclosure, for example, when the display panel includes red sub-pixels R11-R21, green sub-pixels G11-G21, blue sub-pixels B11-B21, red sub-pixels R12-R22, green sub-pixels G12-G22, and blue sub-pixels B12-B82, as shown in FIGS. 3-5, the pixel electrode 02 may include a first edge conductive part 101 and a second edge conductive part 102 that are arranged at an interval in a first direction Y, and a main conductive part at least partially located between the first edge conductive part 101 and the second edge conductive part 102. The main conductive part is connected to the first edge conductive part 101 and the second edge conductive part 102 separately, the main conductive part may include at least one first group of sub-conductive parts and at least one second group of sub-conductive parts, where the first group of sub-conductive parts and the second group of sub-conductive parts are arranged alternately in the first direction Y.

In addition, the first group of sub-conductive parts may include a first connection strip 103 and a plurality of first electrode strips 104 arranged at intervals in the first direction Y. The first connection strip 103 extends in the first direction Y (that is, a length direction of the first connection strip 103 is the first direction Y). The first connection strip 103 may have a first face 103*a* and a second face 103*b* opposite each other in a second direction X. It should be noted that the first direction Y may intersect with the second direction X. Preferably, the first direction Y may be perpendicular to the second direction X (for example, the first direction Y may be a column direction F of the sub-pixels, and the second direction X may be a row direction X of the sub-pixels); and the plurality of first electrode strips 104 may be located at a position of the first face 103*a* away from the second face 103*b* and connected to the first face 103*a*. A slit is formed between two adjacent first electrode strips 104, which may be defined as a first slit S1. Ends of the two adjacent first electrode strips 104 away from the first connection strip 103 are disconnected from each other, that is, one end of the first slit S1 away from the first connection strip 103 is open, where one end of the first slit S1 away from the first connection strip 103 may be defined as an open end for convenience of description.

In addition, the second group of sub-conductive parts includes a second connection strip 105 and a plurality of second electrode strips 106 arranged at intervals in the first direction Y. The second connection strip 105 extends in the first direction Y (that is, a length direction of the second connection strip 105 is the first direction Y). The second connection strip 105 may have a third face 105*a* and a fourth face 105*b* opposite each other in the second direction X. In the second direction X, the third face 105*a* of the second connection strip 105 may be located at one side of the fourth face 105*b* close to the first face 103*a* of the first connection strip 103. The third face 105*a* of the second connection strip 105 may be connected to the first electrode strip 104 close to the second group of sub-conductive parts, specifically, connected to one end of the first electrode strip 104 away from the first connection strip 103. It should be understood that the first electrode strip 104 close to the second group of sub-conductive parts refers to the first electrode strip 104 closest to the second group of sub-conductive parts in the first group of sub-conductive parts. The plurality of second electrode strips 106 are located at a position of the third face 105*a* of the second connection strip 105 away from the fourth face 105*b* and connected to the third face 105*a* of the second connection strip 105. A slit is formed between two adjacent second electrode strips 106, which may be defined as a second slit S2. Ends of the two adjacent second electrode strips 106 away from the second connection strip 105 are disconnected from each other, that is, one end of the second slit S2 away from the second connection strip 105 is open, where one end of the second slit S2 away from the second connection strip 105 may be defined as an open end for convenience of description.

In addition, in the pixel electrode 02, the sum of lengths of first connection strips 103 of all first groups of sub-conductive parts may be designed to be smaller than the sum of lengths of second connection strips 105 of all second groups of sub-conductive parts. It should be noted that the lengths refer to lengths in an extension direction.

In addition, the pixel electrode 02 may be connected to the transistor 01 (as shown in FIGS. 2 and 5) by means of the first edge conductive part 101 or second edge conductive part 102. Specifically, one end of the first edge conductive part 101 or second edge conductive part 102 away from the second connection strip 105 may be configured to be connected to the transistor 01.

In the example of the present disclosure, as shown in FIGS. 3-5, in two adjacent sub-pixels (for example, R11 and G11) in the row direction X or the column direction F, in a first sub-pixel (for example, R11), a first edge conductive part 101 is arranged close to a transistor 01, and a second edge conductive part 102 is arranged away from the transistor 01; and the second connection strip 105 is close to a second sub-pixel (for example, G11) of the two adjacent sub-pixels, and the first connection strip 103 is away from the second sub-pixel (for example, G11).

In the example of the present disclosure, as shown in FIGS. 3-5, in the second sub-pixel (for example, G11), a first edge conductive part 101 is arranged away from a transistor 01, and a second edge conductive part 102 is arranged close to the transistor 01; and the second connection strip 105 is away from the first sub-pixel (for example, R11) of the two adjacent sub-pixels, and the first connection strip 103 is close to the first sub-pixel (for example, R11).

In the example of the present disclosure, as shown in FIGS. 3-5, the quantity of second electrode strips 106 in the first sub-pixel (for example, R11) connected to the second connection strip 105 is different from the quantity of second electrode strips 106 in the second sub-pixel (for example, G11) connected to the second connection strip 105.

In the example of the present disclosure, as shown in FIGS. 3-5, in the first sub-pixel (for example, R11) and the second sub-pixel (for example, G11), the quantity of first electrode strips 104 in the first sub-pixel (for example, R11)

connected to the first connection strip 103 is different from the quantity of first electrode strips 104 in the second sub-pixel (for example, G11) connected to the first connection strip 103.

In the example of the present disclosure, as shown in FIGS. 3-5, a plurality of common electrodes are further arranged between the pixel electrode 02 and a substrate. A row of sub-pixels are provided with one common electrode; the display panel further includes a plurality of bridging parts KB; and two adjacent common electrodes are electrically connected to each other by means of at least one bridging part KB. In addition, in the same sub-pixel, the first connection strip 103 is connected to the second connection strip 105 by means of an adapter ZB; and the adapter ZB has a hollowed-out region LB. In this way, electrical connection performance between the first connection strip 103 and the second connection strip 105 may be improved, and meanwhile, for liquid crystal display, an electric field for driving liquid crystal to rotate may be formed in the hollowed-out region LB. In addition, in the present disclosure, adapters of two adjacent pixel electrodes are not on the same horizontal line, for example, an adapter corresponding to pixel G11 is farther from a connected transistor than an adapter corresponding to pixel R11.

It should be noted that a common electrode may be strip-shaped, and alternatively, a common electrode may be like a pixel electrode and have a plurality of common sub-electrodes, and adjacent common sub-electrodes are connected to each other by means of transverse and longitudinal bridging parts, so as to achieve common voltage transmission.

To sum up, in the example of the present disclosure, peripheries of the first slit S1 and the second slit S2 of the pixel electrode 02 are not all closed, that is, one end of the first slit S1 close to the second connection strip 105 is an open end, and one end of the second slit S2 close to the first connection strip 103 is an open end. It should be understood that when the pixel electrode 02 of the example of the present disclosure is applied to a display product, the open end of the first slit S1 and the open end of the second slit S2 may be adjacent to data lines DA (as shown in FIGS. 2 and 5) at two sides of the pixel electrode 02, respectively. When the pixel electrode is applied to a liquid crystal display product, a range of a dark field of the liquid crystal display product may be effectively reduced, such that transmittance of the liquid crystal display product may be increased, and color cast may be improved.

In the example of the present disclosure, as shown in FIGS. 4 and 5, extension directions of the first electrode strips 104 and the second electrode strips 106 may be the same, that is, the first electrode strips 104 and the second electrode strips 106 may extend in the same direction, that is, the pixel electrode 02 of the present disclosure may have a single-domain structure, such that design difficulty may be reduced. It should be noted that, in the example, a slit between adjacent first electrode strip 104 and second electrode strip 106 may be the second slit S2.

In the example of the present disclosure, as shown in FIGS. 4 and 5, extension directions of the first electrode strips 104 and first slits S1 are the same, such that display uniformity of the first group of sub-conductive parts of the pixel electrode 02 may be ensured; and the extension directions of the first electrode strips 104 and the first slits S1 intersect with the first direction Y and the second direction X, such that color cast may be reduced. Similarly, extension directions of the second electrode strips 106 and second slits S2 are the same, such that display uniformity of the second group of sub-conductive parts of the pixel electrode 02 may be ensured; and the extension directions of the second electrode strips 106 and the second slits S2 intersect with the first direction Y and the second direction X, such that color cast may be reduced. With further reference to FIG. 5, in two adjacent pixel units, for example, R11 and G11, the second electrode strips 106 of R11 are connected to the second connection strip 105 and extend leftwards, the first electrode strips 104 of G11 are connected to the first connection strip 103 and extend rightwards, the first electrode strips 104 of R11 are connected to the first connection strip 103 and extend rightwards, and the second electrode strips 106 of G11 are connected to the second connection strip 105 and extend leftwards, such that the pixel design improves the display color cast.

It should be noted that, in the example of the present disclosure, only the pixel electrode having the structure is used as an example for description. In practical application, an embodiment of a common electrode may also use the structure of the pixel electrode, which is not limited herein.

The following description is based on an example in which a display panel in the example of the present disclosure is a liquid crystal display panel, and a pixel unit includes a red sub-pixel, a green sub-pixel and a blue sub-pixel, but a reader should know that colors of sub-pixels included in the liquid crystal display panel are not limited to the example.

Gray scales generally divide brightness change between darkest and brightest into several parts, so as to facilitate screen brightness control. For example, a displayed image consists of three colors: red, green and blue, each of the colors may show a different brightness level, and red, green and blue colors with different brightness levels may be combined to form different colors. For example, if a gray-scale bit quantity of the liquid crystal display panel is 6 bits, the three colors of red, green and blue have 64 (that is, $2^6$) gray scales, and 64 gray-scale values are 0-63, respectively. If a gray-scale bit quantity of the liquid crystal display panel is 8 bits, the three colors of red, green and blue have 256 (that is, $2^8$) gray scales, and 256 gray-scale values are 0-255, respectively. If a gray-scale bit quantity of the liquid crystal display panel is 10 bits, the three colors of red, green and blue have 1024 (that is, $2^{10}$) gray scales, and 1024 gray-scale values are 0-1023, respectively. If a gray-scale bit quantity of the liquid crystal display panel is 12 bits, the three colors of red, green and blue have 4096 (that is, $2^{12}$) gray scales, and 4096 gray-scale values are 0-4093, respectively.

For example, with one sub-pixel SPX as an example, when a data voltage Vda1 input to a pixel electrode of the sub-pixel SPX is greater than a common electrode voltage Vcom, liquid crystal molecules at the sub-pixel SPX may be positive, and polarity corresponding to the data voltage Vda1 in the sub-pixel SPX is positive. When a data voltage Vda2 input to a pixel electrode of the sub-pixel SPX is smaller than a common electrode voltage Vcom, liquid crystal molecules at the sub-pixel SPX may be negative, and polarity corresponding to the data voltage Vda2 in the sub-pixel SPX is negative. For example, the common electrode voltage may be 8.3 V. If a data voltage of 8.8 V-16 V is input to the pixel electrode of the sub-pixel SPX, the liquid crystal molecules at the sub-pixel SPX may be positive, and the data voltage of 8.8 V-16 V is a data voltage corresponding to positive polarity. If a data voltage of 0.6 V-7.8 V is input to the pixel electrode of the sub-pixel SPX, the liquid crystal molecules at the sub-pixel SPX may be negative, and the data voltage of 0.6 V-7.8 V is a data voltage corresponding to negative polarity. For example, with gray scales 0-255 of 8 bits as an example, if a data voltage of 16 V is input to the pixel electrode of the sub-pixel SPX, the sub-pixel SPX may use a positive data voltage to achieve brightness of a maximum gray-scale value (that is, a gray-scale value 255). If a data voltage of 0.6 V is input to the pixel electrode of the sub-pixel SPX, the sub-pixel SPX may use a negative data voltage to achieve brightness of a maximum gray-scale value (that is, a gray-scale value 255). It should be noted that there may be a voltage difference between a data voltage of a gray-scale value 0 and a common electrode voltage, for example, the common electrode voltage is 8.3 V, a positive data voltage corresponding to the gray-scale value 0 may be 8.8 V, and a negative data voltage corresponding to the gray-scale value 0 may be 7.8 V. Certainly, the data voltage of the gray-scale value 0 may be the same as the common electrode voltage. In practical application, whether there is a voltage difference may be determined according to an actual application requirement, which is not limited herein.

To further improve color cast, there is provided a drive method. The drive method may include the steps that a first display gray-scale value and a second display gray-scale value are generated according to an original gray-scale value of each sub-pixel of an image to be displayed, and in each display frame, the first display gray-scale value and the second display gray-scale value are used to control one sub-pixel in adjacent sub-pixels on a display panel to use the first display gray-scale value to display higher brightness, and control the other sub-pixel to use the second display gray-scale value to display lower brightness, respectively, where the first display gray-scale value is greater than the second display gray-scale value, such that data voltages applied to the two adjacent sub-pixels are different. For example, as shown in FIG. 3, in an nth display frame F_n, a red sub-pixel R11, a green sub-pixel G21, a blue sub-pixel B11, a red sub-pixel R22, a green sub-pixel G12 and a blue sub-pixel B22 use the first display gray-scale value to display higher brightness, and a red sub-pixel R21, a green sub-pixel G11, a blue sub-pixel B21, a red sub-pixel R12, a green sub-pixel G22 and a blue sub-pixel B12 use the second display gray-scale value to display lower brightness. In an (n+1)th display frame F_n+1, a red sub-pixel R11, a green sub-pixel G21, a blue sub-pixel B11, a red sub-pixel R22, a green sub-pixel G12 and a blue sub-pixel B22 also use the first display gray-scale value to display higher brightness, and a red sub-pixel R21, a green sub-pixel G11, a blue sub-pixel B21, a red sub-pixel R12, a green sub-pixel G22 and a blue sub-pixel B12 also use the second display gray-scale value to display lower brightness. In an (n+2)th display frame F_n+2, a red sub-pixel R11, a green sub-pixel G21, a blue sub-pixel B11, a red sub-pixel R22, a green sub-pixel G12 and a blue sub-pixel B22 also use the first display gray-scale value to display higher brightness, and a red sub-pixel R21, a green sub-pixel G11, a blue sub-pixel B21, a red sub-pixel R12, a green sub-pixel G22 and a blue sub-pixel B12 also use the second display gray-scale value to display lower brightness. In this way, sub-pixels having the same domain direction consistently display higher or lower brightness, such that when liquid crystal molecules correspond to a short axis, an image may be blue, and when liquid crystal molecules correspond to a long axis, an image may be yellow. Therefore, there is a problem of color cast in left and right viewing angles.

An example of the present disclosure provides a drive method for a display panel. The display panel works in a plurality of continuous display frames. If current original gray-scale values corresponding to sub-pixels in the same region are the same in the plurality of continuous display frames, the original gray-scale values may be converted into two gray-scale values: a first target gray-scale value and a second target gray-scale value. The first target gray-scale value is greater than the current original gray-scale values, such that for the sub-pixels, displayed brightness corresponding to the first target gray-scale value may be higher than displayed brightness corresponding to the current original gray-scale values. In addition, the second target gray-scale value is smaller than the current original gray-scale values, such that for the sub-pixels, displayed brightness corresponding to the second target gray-scale value may be lower than displayed brightness corresponding to the current original gray-scale values. In this way, the displayed brightness corresponding to the first target gray-scale value and the displayed brightness corresponding to the second target gray-scale value are mixed, and the brightness corresponding to the current original gray-scale values is displayed. In addition, in a current display frame, a data voltage corresponding to the first target gray-scale value is controlled to be input to a first sub-pixel unit SPX-1 in a region, and a data voltage corresponding to the second target gray-scale value is controlled to be input to a second sub-pixel unit SPX-2 in the region. Moreover, in a next display frame, a data voltage corresponding to the second target gray-scale value is controlled to be input to the first sub-pixel unit SPX-1 in the region, and a data voltage corresponding to the first target gray-scale value is controlled to be input to the second sub-pixel unit SPX-2 in the region. In this way, sub-pixels having higher brightness in the current display frame may have lower display brightness in the next display frame. Sub-pixels having lower brightness in the current display frame may have higher display brightness in the next display frame. In this way, color cast may be improved by combining time color mixing with space color mixing.

Figure 6:
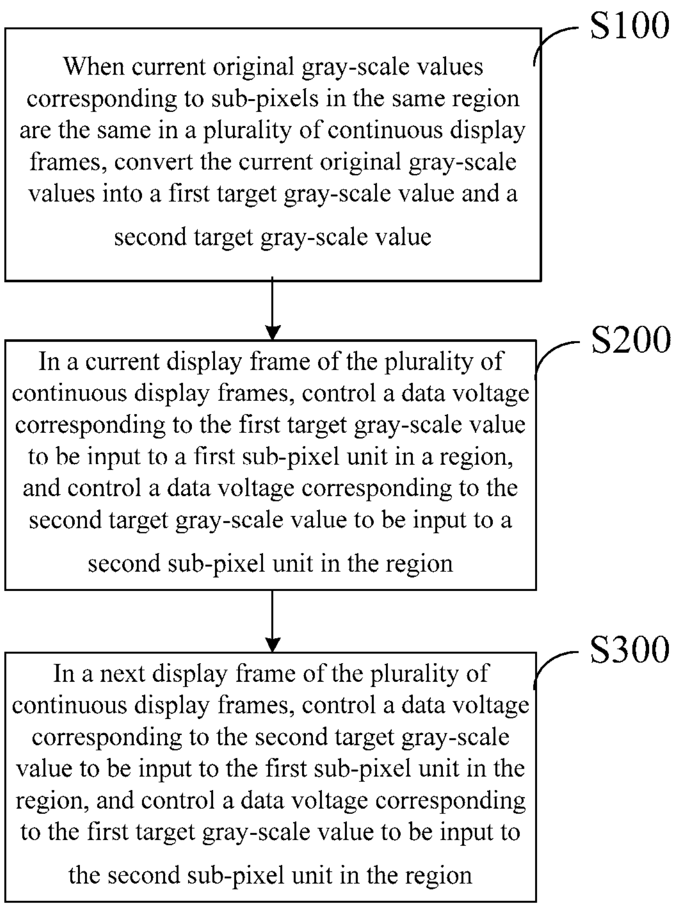
FIG. 6 is a flow diagram of a drive method for a display panel provided in an example of the present disclosure.

As shown in FIG. 6, an example of the present disclosure provides a drive method for a display panel. The drive method may include the following steps.

S100, when current original gray-scale values corresponding to sub-pixels in the same region are the same in a plurality of continuous display frames, the current original gray-scale values are converted into a first target gray-scale value and a second target gray-scale value.

For example, S100 may include the step that original display data of each sub-pixel in the plurality of continuous display frames is received. The original display data includes a digital voltage form of a data voltage having a corresponding gray-scale value corresponding to each sub-pixel, and the gray-scale value corresponding to the data voltage is an original gray-scale value. In this way, the current original gray-scale value of each sub-pixel in the plurality of continuous display frames may be determined according to the original display data of each sub-pixel in the plurality of continuous display frames.

In the example of the present disclosure, whether the original gray-scale values corresponding to the sub-pixels in the same region are the same may be determined according to the current original gray-scale value of each sub-pixel in the plurality of continuous display frames. If yes, it is indicated that the region displays an image of the same gray scale, such that color cast is likely to occur. For example, original gray-scale values corresponding to the sub-pixels in the region are all gray-scale values 127, such that an image displayed in the region may be a gray-scale image. For example, original gray-scale values corresponding to the sub-pixels in the region are all gray-scale values 255, such that an image displayed in the region may be a white image (for example, white clouds are displayed in the region).

Therefore, in order to improve color cast, the current original gray-scale values may be converted into the first target gray-scale value and the second target gray-scale value. In addition, the first target gray-scale value is greater than the current original gray-scale values, and the second target gray-scale value is smaller than the current original gray-scale values. For example, with gray scales 0-255 as an example, if the current original gray-scale value is a gray-scale value 127, the first target gray-scale value may be set as a gray-scale value 170, and the second target gray-scale value may be set as a gray-scale value 40.

It should be noted that the region may be a whole region of an image displayed on a display panel, or may be one or more regions of partial regions of an image displayed on a display panel, which is not limited herein.

S200, in a current display frame of the plurality of continuous display frames, a data voltage corresponding to the first target gray-scale value is controlled to be input to a first sub-pixel unit SPX-1 in a region, and a data voltage corresponding to the second target gray-scale value is controlled to be input to a second sub-pixel unit SPX-2 in the region.

In the example of the present disclosure, each of the first sub-pixel unit SPX-1 and the second sub-pixel unit SPX-2 includes at least one sub-pixel. For example, the quantity of sub-pixels included in the first sub-pixel unit SPX-1 and the quantity of sub-pixels included in the second sub-pixel unit SPX-2 may be the same. Alternatively, the quantity of sub-pixels included in the first sub-pixel unit SPX-1 and the quantity of sub-pixels included in the second sub-pixel unit SPX-2 may be different. In practical application, whether the quantity of sub-pixels included in the first sub-pixel unit and the quantity of sub-pixels included in the second sub-pixel unit are the same or not may be determined according to an actual application requirement, which is not limited herein.

Figure 7:
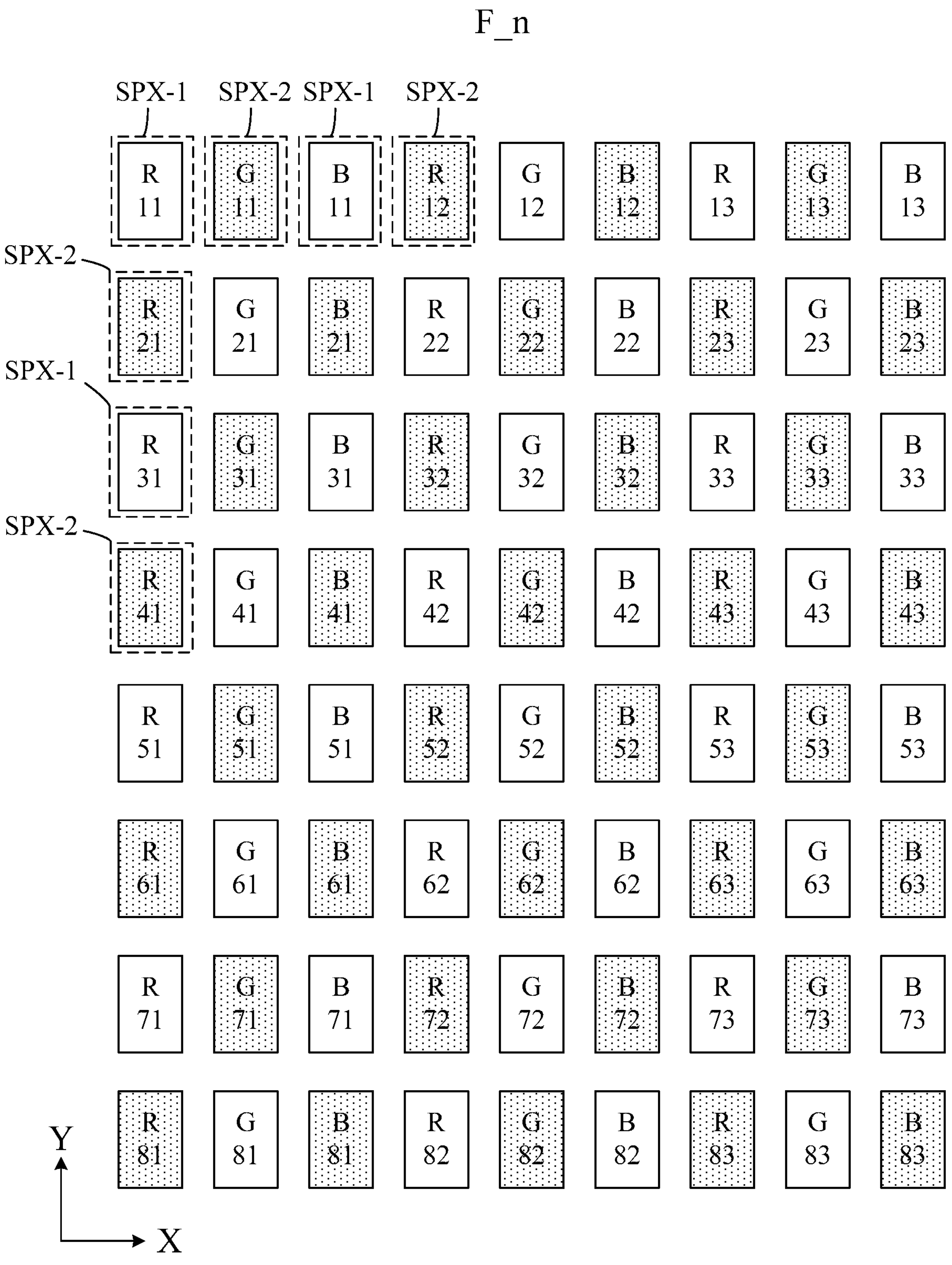
FIG. 7 shows a diagram of still some other structures of a display panel provided in an example of the present disclosure.

In the example of the present disclosure, the at least one first sub-pixel unit SPX-1 may be adjacent to the at least one second sub-pixel unit SPX-2. For example, in a row direction X and a column direction F of sub-pixels, the sub-pixels may be repeated in sequence of the first sub-pixel unit SPX-1 and the second sub-pixel unit SPX-2. For example, each of the first sub-pixel unit SPX-1 and the second sub-pixel unit SPX-2 includes one sub-pixel. As shown in FIG. 7, for example, when current original gray-scale values corresponding to regions formed by red sub-pixels R11-R81, green sub-pixels G11-G81, blue sub-pixels B11-B81, red sub-pixels R12-R82, green sub-pixels G12-G82, blue sub-pixels B12-B82, red sub-pixels R13-R83, green sub-pixels G13-G83 and blue sub-pixels B13-B83 are the same, in a first row of sub-pixels, arrangement is conducted by taking the red sub-pixel R11 as one first sub-pixel unit SPX-1, the green sub-pixel G11 as one second sub-pixel unit SPX-2, the blue sub-pixel B11 as one first sub-pixel unit SPX-1, the red sub-pixel R11 as one second sub-pixel unit SPX-2, the green sub-pixel G12 as one first sub-pixel unit SPX-1, the blue sub-pixel B12 as one second sub-pixel unit SPX-2, the red sub-pixel R13 as one first sub-pixel unit SPX-1, the green sub-pixel G13 as one second sub-pixel unit SPX-2, and the blue sub-pixel B13 as one first sub-pixel unit SPX-1. Other rows of sub-pixels may be analogized in turn, which will not be repeated herein. In addition, in a first column of sub-pixels, the red sub-pixel R11 serves as one first sub-pixel unit SPX-1, the red sub-pixel R21 serves as one second sub-pixel unit SPX-2, the red sub-pixel R31 serves as one first sub-pixel unit SPX-1, the red sub-pixel R41 serves as one second sub-pixel unit SPX-2, the red sub-pixel R51 serves as one first sub-pixel unit SPX-1, the red sub-pixel R61 serves as one second sub-pixel unit SPX-2, the red sub-pixel R71 serves as one first sub-pixel unit SPX-1, and the red sub-pixel R81 serves as one second sub-pixel unit SPX-2. Other columns of sub-pixels may be analogized in turn, which will not be repeated herein.

For example, with a current original gray-scale value of 127, a first target gray-scale value of 170 and a second target gray-scale value of 40 as an example, as shown in FIG. 7, in a current display frame F_n, data voltages corresponding to the gray-scale value 170 may be input to the red sub-pixels R11, R31, R51, R71, R22, R42, R62, R82, R13, R33, R53, and R73, the green sub-pixels G21, G41, G61, G81, G12, G32, G52, G72, G23, G43, G63, and G83, and the blue sub-pixels B11, B31, B51, B71, B22, B42, B62, B82, B13, B33, B53, and B73, respectively, such that brightness displayed by the sub-pixels may be brightness corresponding to the gray-scale value 170. In addition, data voltages corresponding to the gray-scale value 40 may be input to the red sub-pixels R21, R41, R61, R81, R12, R22, R52, R72, R23, R43, R63, and R83, the green sub-pixels G11, G31, G51, G71, G22, G42, G62, G82, G13, G33, G53, and G73, and the blue sub-pixels B21, B41, B61, B81, B12, B22, B52, B72, B23, B43, B63, and B83, respectively, such that brightness displayed by the sub-pixels may be brightness corresponding to the gray-scale value 40. The brightness corresponding to the gray-scale value 170 is higher than that corresponding to the gray-scale value 127, and the brightness corresponding to the gray-scale value 40 is lower than that corresponding to the gray-scale value 127, such that two adjacent sub-pixels may achieve the brightness of the gray-scale value 127 through brightness mixing, mixed brightness displayed by the region may be the brightness of the gray-scale value 127, and then color cast may be improved.

S300, in a next display frame of the plurality of continuous display frames, a data voltage corresponding to the second target gray-scale value is controlled to be input to the first sub-pixel unit SPX-1 in the region, and a data voltage corresponding to the first target gray-scale value is controlled to be input to the second sub-pixel unit SPX-2 in the region.

Figure 8:
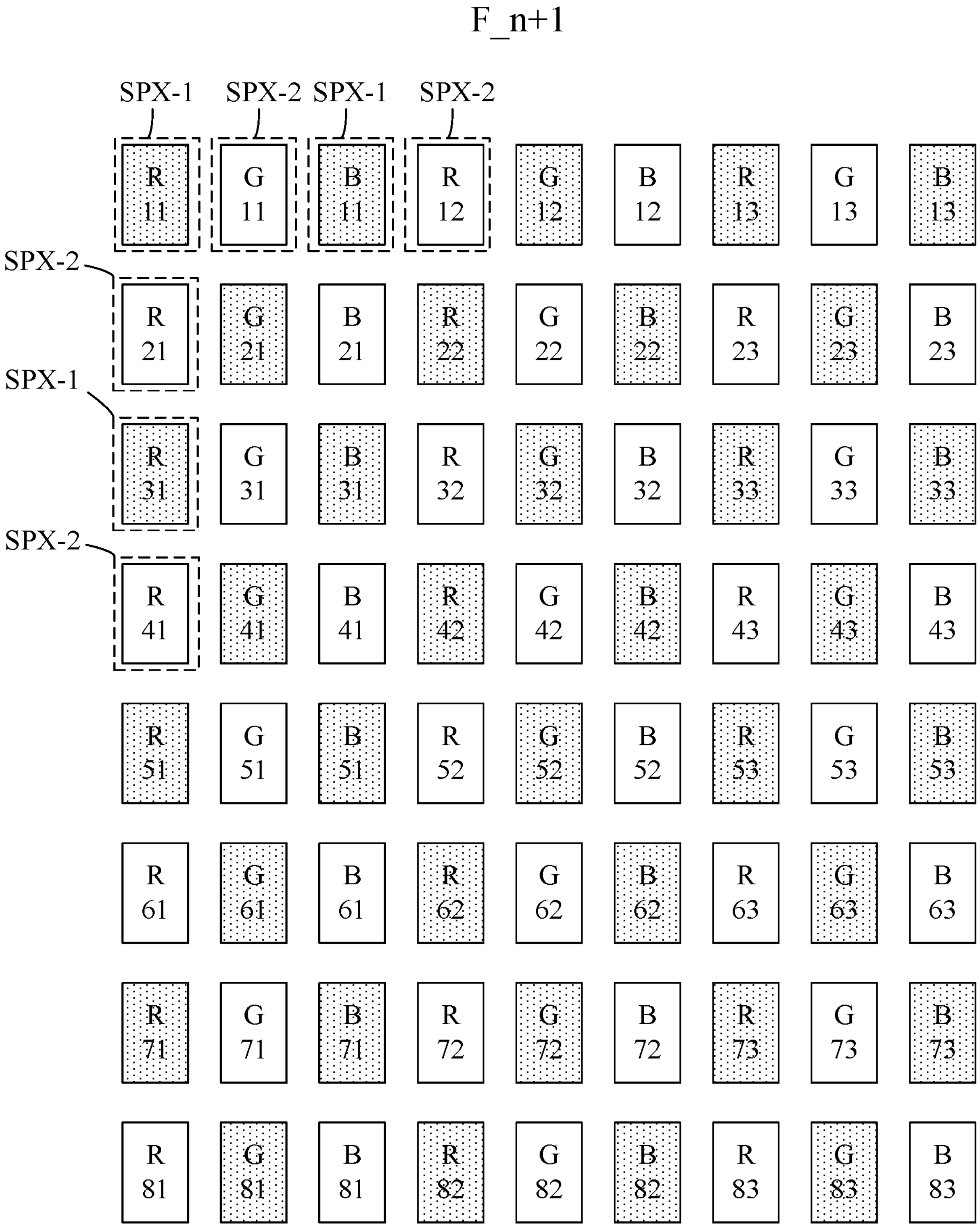
FIG. 8 shows a diagram of still some other structures of a display panel provided in an example of the present disclosure.

For example, with a current original gray-scale value of 127, a first target gray-scale value of 170 and a second target gray-scale value of 40 as an example, as shown in FIG. 8, in a next display frame F_n+1, data voltages corresponding to the gray-scale value 40 may be input to the red sub-pixels R11, R31, R51, R71, R22, R42, R62, R82, R13, R33, R53, and R73, the green sub-pixels G21, G41, G61, G81, G12, G32, G52, G72, G23, G43, G63, and G83, and the blue sub-pixels B11, B31, B51, B71, B22, B42, B62, B82, B13, B33, B53, and B73, respectively, such that brightness displayed by the sub-pixels may be brightness corresponding to the gray-scale value 40. In addition, data voltages corresponding to the gray-scale value 170 may be input to the red sub-pixels R21, R41, R61, R81, R12, R22, R52, R72, R23, R43, R63, and R83, the green sub-pixels G11, G31, G51, G71, G22, G42, G62, G82, G13, G33, G53, and G73, and the blue sub-pixels B21, B41, B61, B81, B12, B22, B52, B72, B23, B43, B63, and B83, respectively, such that brightness displayed by the sub-pixels may be brightness corresponding to the gray-scale value 170. The brightness corresponding to the gray-scale value 170 is higher than that corresponding to the gray-scale value 127, and the brightness corresponding to the gray-scale value 40 is lower than that corresponding to the gray-scale value 127, such that two adjacent sub-pixels may achieve the brightness of the gray-scale value 127 through brightness mixing, mixed brightness displayed by the region may be the brightness of the gray-scale value 127, and then color cast may be improved.

In the example of the present disclosure, a first target gray-scale value and a second target gray-scale value corresponding to sub-pixels in a first sub-pixel unit SPX-1 and a second sub-pixel unit SPX-2 in a display frame F_n+2 are basically the same as the first target gray-scale value and the second target gray-scale value corresponding to the sub-pixels in the first sub-pixel unit SPX-1 and the second sub-pixel unit SPX-2 in the display frame F_n. A first target gray-scale value and a second target gray-scale value corresponding to sub-pixels in a first sub-pixel unit SPX-1 and a second sub-pixel unit SPX-2 in a display frame F_n+3 are basically the same as the first target gray-scale value and the second target gray-scale value corresponding to the sub-pixels in the first sub-pixel unit SPX-1 and the second sub-pixel unit SPX-2 in the display frame F_n+1. Other display frames may be analogized in turn, which will not be repeated herein.

In the example of the present disclosure, a timing controller may convert, when the current original gray-scale values corresponding to the sub-pixels in the same region are the same in the plurality of continuous display frames, the current original gray-scale values into the first target gray-scale value and the second target gray-scale value, and output the first target gray-scale value and the second target gray-scale value to a source drive circuit. After the source drive circuit receives the first target gray-scale value and the second target gray-scale value output from the timing controller, in the current display frame of the plurality of continuous display frames, the data voltage corresponding to the first target gray-scale value may be controlled to be input to the first sub-pixel unit SPX-1 in the region, and the data voltage corresponding to the second target gray-scale value may be controlled to be input to the second sub-pixel unit SPX-2 in the region. In addition, in the next display frame of the plurality of continuous display frames, the data voltage corresponding to the second target gray-scale value may be controlled to be input to the first sub-pixel unit SPX-1 in the region, and the data voltage corresponding to the first target gray-scale value may be controlled to be input to the second sub-pixel unit SPX-2 in the region.

In the example of the present disclosure, in the plurality of continuous display frames, for a sub-pixel except the region, the timing controller may directly output a current original gray-scale value corresponding to the sub-pixel to the source drive circuit. After the source drive circuit receives the current original gray-scale value output from the timing controller, in the current display frame of the plurality of continuous display frames, the data voltage corresponding to the current original gray-scale value may be controlled to be input to the sub-pixel except the region. In addition, in the next display frame of the plurality of continuous display frames, the data voltage corresponding to the current original gray-scale value is controlled to be input to the sub-pixel except the region.

For example, the timing controller may determine whether the current original gray-scale values corresponding to the sub-pixels in the same region are within a gray-scale range in the plurality of continuous display frames in advance. If the current original gray-scale values corresponding to the sub-pixels in the same region are within the gray-scale range, the current original gray-scale values are converted into the first target gray-scale value and the second target gray-scale value, and the first target gray-scale value and the second target gray-scale value are output to the source drive circuit, such that in the current display frame, the source drive circuit may control the data voltage corresponding to the first target gray-scale value to be input to the first sub-pixel unit SPX-1 in the region, and control the data voltage corresponding to the second target gray-scale value to be input to the second sub-pixel unit SPX-2 in the region. Moreover, in the next display frame, the data voltage corresponding to the second target gray-scale value is controlled to be input to the first sub-pixel unit SPX-1 in the region, and the data voltage corresponding to the first target gray-scale value is controlled to be input to the second sub-pixel unit SPX-2 in the region. If the current original gray-scale values corresponding to the sub-pixels in the same region are not within the gray-scale range, it is difficult for human eyes to observe an afterimage, and the current original gray-scale value corresponding to the sub-pixel is directly output to the source drive circuit, such that after the source drive circuit receives the current original gray-scale value output from the timing controller, in the current display frame of the plurality of continuous display frames, the data voltage corresponding to the current original gray-scale value may be controlled to be input to the sub-pixel except the region. In addition, in the next display frame of the plurality of continuous display frames, the data voltage corresponding to the current original gray-scale value is controlled to be input to the sub-pixel in the region. Optionally, with 8 bits as an example, a gray-scale range may be gray-scale values 311-180, and includes an end value. If a gray-scale value is smaller than a gray-scale value 31 or greater than a gray-scale value 180, it is difficult for human eyes to observe and recognize mura. In this case, a drive mode of converting the current original gray-scale values into the first target gray-scale value and the second target gray-scale value may be avoided, such that power consumption may be reduced.

In the example of the present disclosure, the step that the current original gray-scale values are converted into the first target gray-scale value and the second target gray-scale value may include the step that the current original gray-scale values with a default gray-scale bit quantity are converted into the first target gray-scale value and the second target gray-scale value with a target gray-scale bit quantity. The target gray-scale bit quantity may be equal to the default gray-scale bit quantity. For example, the target gray-scale bit quantity and the default gray-scale bit quantity may both be 8 bits, 10 bits, 12 bits, etc. With 8 bits as an example, a gray-scale value 127 of 8 bits may be converted into a gray-scale value 170 and a gray-scale value 40 of 8 bits. In this case, a gray scale 170 and a gray scale 40 are mixed to form a gray scale 127. Compared with the gray scale 127, the gray scale 170 and the gray scale 40 are not sensitive to voltages, so it is not easy for a user to observe an afterimage. Alternatively, the target gray-scale bit quantity may be greater than the default gray-scale bit quantity. For example, the target gray-scale bit quantity is 10 bits, and the default gray-scale bit quantity is 8 bits. With 8 bits as an example, the gray-scale value 127 of 8 bits may be converted into a gray-scale value 680 and a gray-scale value 160 of 10 bits.

In the example of the present disclosure, the timing controller may store a first lookup table. The first lookup table may include: a plurality of different original gray-scale values corresponding to the default gray-scale bit quantity, and a plurality of first different target gray-scale values and a plurality of second different target gray-scale values corresponding to the target gray-scale bit quantity; and in the first lookup table, one original gray-scale value corresponds to one first target gray-scale value and one second target gray-scale value. For example, the original gray-scale values in the first lookup table are all gray-scale values of the default gray-scale bit quantity. For example, when a default gray-scale bit quantity is 8 bits, the first lookup table has all the gray-scale values of 0-255, and one first target gray-scale value and one second target gray-scale value corresponding to each of the gray-scale values 0-255. For example, with the target gray-scale bit quantity and the default gray-scale bit quantity of 8 bits as an example, Table 1 schematically shows first target gray-scale values L_H and second target gray-scale values L_L corresponding to gray-scale values 125-130. It should be noted that specific values of gray-scale values shown in Table 1 are only illustrative. In practical application, the specific values of the gray-scale values may be determined according to an actual application requirement, which are not limited herein.

TABLE 1

| Original gray-scale value | L_H | L_L |
|---|---|---|
| 125 | 168 | 38 |
| 126 | 169 | 39 |
| 127 | 170 | 40 |
| 128 | 171 | 41 |
| 129 | 172 | 42 |
| 130 | 173 | 43 |

In the example of the present disclosure, the first lookup table includes first target gray-scale values and second target gray-scale values corresponding to sub-pixels with various colors. For example, the first lookup table includes a first target gray-scale value and a second target gray-scale value corresponding to a red sub-pixel corresponding to each original gray-scale value, a first target gray-scale value and a second target gray-scale value corresponding to a green sub-pixel corresponding to each original gray-scale value, and a first target gray-scale value and a second target gray-scale value corresponding to a blue sub-pixel corresponding to each original gray-scale value. For example, with the target gray-scale bit quantity and the default gray-scale bit quantity of 8 bits as an example, Table 2 schematically shows first target gray-scale values LR_H and second target gray-scale values LR_L of red sub-pixels corresponding to gray-scale values 125-130, first target gray-scale values LG_H and second target gray-scale values LG_L of green sub-pixels corresponding to the gray-scale values, and first target gray-scale values LB_H and second target gray-scale values LB_L of blue sub-pixels corresponding to the gray-scale values. It should be noted that specific values of gray-scale values shown in Table 1 are only illustrative. In practical application, the specific values of the gray-scale values may be determined according to an actual application requirement, which are not limited herein.

TABLE 2

| Original gray-scale value | LR_H | LG_H | LB_H | LR_L | LG_L | LB_L |
|---|---|---|---|---|---|---|
| 125 | 168 | 168 | 168 | 38 | 38 | 38 |
| 126 | 169 | 169 | 169 | 39 | 39 | 39 |
| 127 | 170 | 170 | 170 | 40 | 40 | 40 |
| 128 | 171 | 171 | 171 | 41 | 41 | 41 |
| 129 | 172 | 172 | 172 | 42 | 42 | 42 |
| 130 | 173 | 173 | 173 | 43 | 43 | 43 |

In the example of the present disclosure, the step that the current original gray-scale values with a default gray-scale bit quantity are converted into the first target gray-scale value and the second target gray-scale value with a target gray-scale bit quantity may include the step that the first target gray-scale value and the second target gray-scale value corresponding to the current original gray-scale values are determined from the first pre-stored lookup table according to the current original gray-scale values. For example, with reference to Table 2, when a current original gray-scale value is a gray-scale value 127, by looking up the first lookup table, it may be determined that a first target gray-scale value corresponding to a red sub-pixel is a gray-scale value 170, a first target gray-scale value corresponding to a green sub-pixel is a gray-scale value 170, a first target gray-scale value corresponding to a blue sub-pixel is a gray-scale value 170, a second target gray-scale value corresponding to a red sub-pixel is a gray-scale value 40, a second target gray-scale value corresponding to a green sub-pixel is a gray-scale value 40, and a second target gray-scale value corresponding to a blue sub-pixel is a gray-scale value 40. In this way, a data voltage corresponding to a gray-scale value 170 may be input to a red sub-pixel in the first sub-pixel unit SPX-1, a data voltage corresponding to a gray-scale value 170 may be input to a green sub-pixel in the first sub-pixel unit SPX-1, a data voltage corresponding to a gray-scale value 170 may be input to a blue sub-pixel in the first sub-pixel unit SPX-1, a data voltage corresponding to a gray-scale value 40 may be input to a red sub-pixel in the second sub-pixel unit SPX-2, a data voltage corresponding to a gray-scale value 40 may be input to a green sub-pixel in the second sub-pixel unit SPX-2, and a data voltage corresponding to a gray-scale value 40 may be input to a blue sub-pixel in the second sub-pixel unit SPX-2.

In the example of the present disclosure, the display panel may be driven through frame flipping, column flipping, row flipping and dot flipping. For example, with frame flipping as an example, in the display frame F_n, a data voltage input to each sub-pixel may correspond to positive polarity. In the display frame F_n+1, a data voltage input to each sub-pixel may correspond to negative polarity. In the display frame F_n+2, a data voltage input to each sub-pixel may correspond to positive polarity. In the display frame F_n+3, a data voltage input to each sub-pixel may correspond to negative polarity. However, for the first sub-pixel unit SPX-1, in the display frames F_n and F_n+2 in which the first sub-pixel unit SPX-1 displays higher brightness, polarity corresponding to the sub-pixels in the first sub-pixel unit SPX-1 is always positive. In the display frames F_n+1 and F_n+3 in which the first sub-pixel unit SPX-1 displays lower brightness, polarity corresponding to the sub-pixels in the first sub-pixel unit SPX-1 is always negative. Moreover, for the second sub-pixel unit SPX-2, in the display frames F_n and F_n+2 in which the second sub-pixel unit displays lower brightness, polarity corresponding to the sub-pixels in the second sub-pixel unit SPX-2 is always positive. In the display frames F_n+1 and F_n+3 in which the first sub-pixel unit SPX-1 displays higher brightness, polarity corresponding to the sub-pixels in the first sub-pixel unit SPX-1 is always negative. In this way, color cast may occur due to polarization of liquid crystal molecules. In order to avoid color cast due to polarization of liquid crystal molecules, in the example of the present disclosure, in the plurality of continuous display frames, polarity corresponding to the data voltage input to each sub-pixel in the first sub-pixel unit SPX-1 and the second sub-pixel unit SPX-2 may be controlled to be reversed once after an even quantity of display frames.

Figure 9:
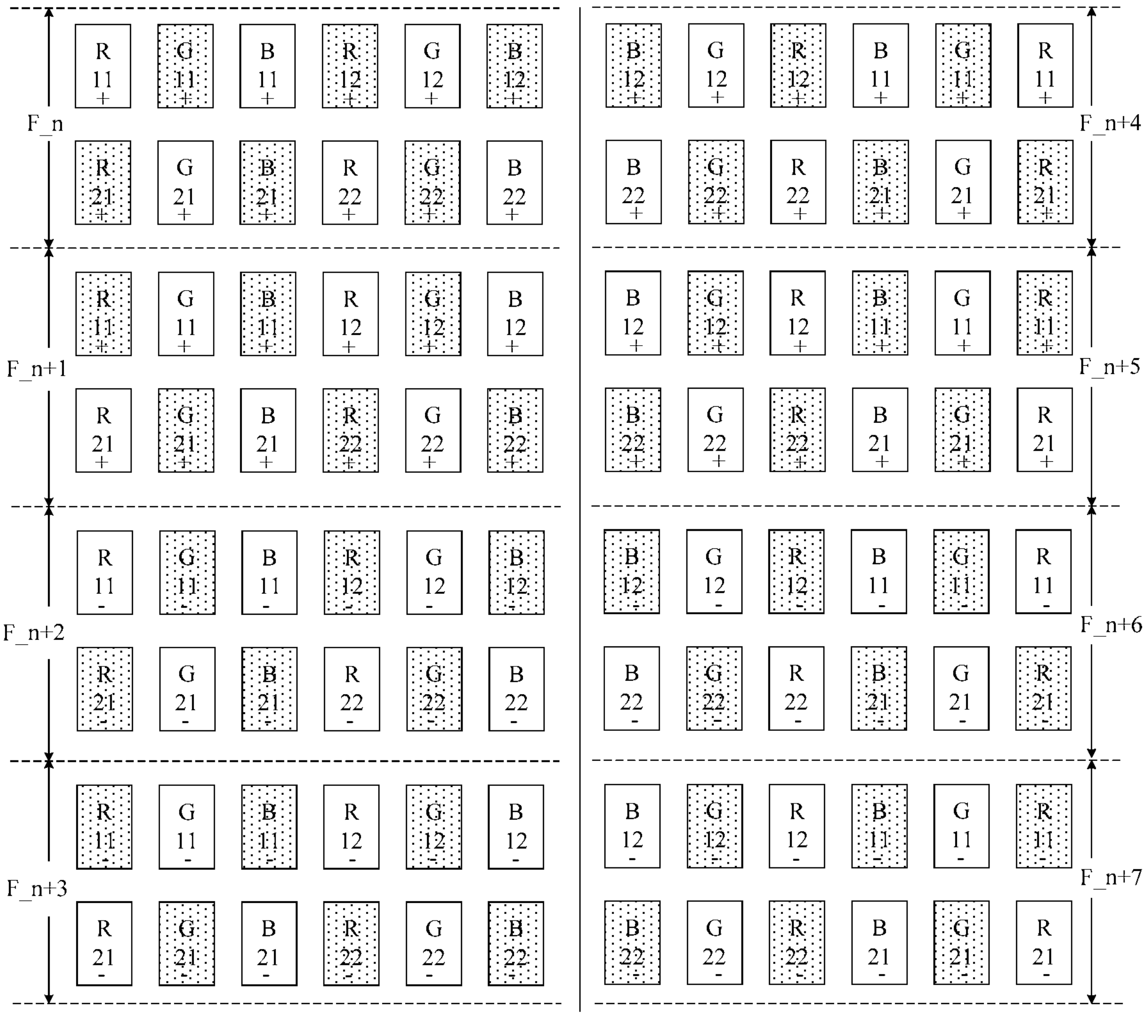
FIG. 9 shows a diagram of still some other structures of a display panel provided in an example of the present disclosure.

For example, in the plurality of continuous display frames, polarity corresponding to the data voltage input to each sub-pixel in the first sub-pixel unit SPX-1 and the second sub-pixel unit SPX-2 may be controlled to be reversed once after two display frames. For example, when frame flipping is used and each of the first sub-pixel unit SPX-1 and the second sub-pixel unit SPX-2 includes one sub-pixel, as shown in FIG. 9, in the display frame F_n, data voltages corresponding to positive polarity are input to sub-pixels R11-B12 in a first row and sub-pixels R21-B22 in a second row, respectively. In the display frame F_n+1, data voltages corresponding to positive polarity are also input to sub-pixels R11-B12 in a first row and sub-pixels R21-B22 in a second row, respectively. In the display frame F_n+2, data voltages corresponding to negative polarity are input to sub-pixels R11-B12 in a first row and sub-pixels R21-B22 in a second row, respectively. In the display frame F_n+3, data voltages corresponding to negative polarity are also input to sub-pixels R11-B12 in a first row and sub-pixels R21-B22 in a second row, respectively. In the display frame F_n+4, data voltages corresponding to positive polarity are input to sub-pixels R11-B12 in a first row and sub-pixels R21-B22 in a second row, respectively. In the display frame F_n+5, data voltages corresponding to positive polarity are also input to sub-pixels R11-B12 in a first row and sub-pixels R21-B22 in a second row, respectively. In the display frame F_n+6, data voltages corresponding to negative polarity are input to sub-pixels R11-B12 in a first row and sub-pixels R21-B22 in a second row, respectively. In the display frame F_n+7, data voltages corresponding to negative polarity are also input to sub-pixels R11-B12 in a first row and sub-pixels R21-B22 in a second row, respectively. Processes of other display frames may be analogized in turn, which will not be repeated herein.

For example, in the plurality of continuous display frames, polarity corresponding to the data voltage input to each sub-pixel in the first sub-pixel unit SPX-1 and the second sub-pixel unit SPX-2 may also be controlled to be reversed once after four display frames. For example, when frame flipping is used and each of the first sub-pixel unit SPX-1 and the second sub-pixel unit SPX-2 includes one sub-pixel, in the display frames F_n-F_n+3, data voltages corresponding to positive polarity are input to sub-pixels R11-B12 in a first row and sub-pixels R21-B22 in a second row, respectively. In the display frames F_n+4-F_n+7, data voltages corresponding to negative polarity are input to sub-pixels R11-B12 in a first row and sub-pixels R21-B22 in a second row: respectively. In the display frames F_n+8-F_n+11, data voltages corresponding to positive polarity are input to sub-pixels R11-B12 in a first row and sub-pixels R21-B22 in a second row, respectively. In the display frames F_n+12-F_n+15, data voltages corresponding to negative polarity are input to sub-pixels R11-B12 in a first row and sub-pixels R21-B22 in a second row: respectively. Processes of other display frames may be analogized in turn, which will not be repeated herein.

It should be noted that in the plurality of continuous display frames, polarity corresponding to the data voltage input to each sub-pixel in the first sub-pixel unit SPX-1 and the second sub-pixel unit SPX-2 may also be controlled to be reversed once after six, eight or more display frames, which is not limited herein.

An example of the present disclosure provides some other drive methods for a display panel, which modify embodiments in the examples. Only differences between the example and the above examples will be described below, and similarities will not be repeated herein.

In the example of the present disclosure, the timing controller may store a second lookup table. The second lookup table includes: a plurality of different original gray-scale values corresponding to the default gray-scale bit quantity, a plurality of different intermediate gray-scale values corresponding to the intermediate gray-scale bit quantity, and a plurality of first different target gray-scale values and a plurality of second different target gray-scale values corresponding to the target gray-scale bit quantity; and in the second lookup table, one original gray-scale value corresponds to one intermediate gray-scale value, and one intermediate gray-scale value corresponds to one first target gray-scale value and one second target gray-scale value. In addition, the intermediate gray-scale bit quantity of the current intermediate gray-scale value is greater than the default gray-scale bit quantity, and the intermediate gray-scale bit quantity is smaller than the target gray-scale bit quantity. For example, the default gray-scale bit quantity may be 8 bits, the intermediate gray-scale bit quantity may be 10 bits, and the target gray-scale bit quantity may be 12 bits. In this way, one gray-scale value of 8 bits may be converted into an intermediate gray-scale value of 10 bits, then the intermediate gray-scale value of 10 bits may be converted into a first target gray-scale value and a second target gray-scale value of 12 bits, and then the first target gray-scale value and second target gray-scale value of 12 bits may be used to control display brightness of the sub-pixels in the first sub-pixel unit SPX-1 and the second sub-pixel unit SPX-2, such that display brightness of the sub-pixels in the first sub-pixel unit SPX-1 is mixed with display brightness of the sub-pixels in the second sub-pixel unit SPX-2, and then brightness of a gray-scale value 127 of 8 bits is displayed. If a gray-scale value of 8 bits is directly used to conduct mixing to obtain the brightness of the gray-scale value 127 of 8 bits, mixed brightness may be rough. A gray-scale value of 12 bits is finer in brightness distinguishing, so mixed brightness of 8 bits by using a gray-scale value of 12 bits may be finer and closer to brightness of 8 bits.

For example, original gray-scale values in the second lookup table are all gray-scale values of the default gray-scale bit quantity. For example, when a default gray-scale bit quantity is 8 bits, the second lookup table has all the gray-scale values of 0-255, and one intermediate gray-scale value, one first target gray-scale value and one second target gray-scale value corresponding to each of the gray-scale values 0-255. For example, with a default gray-scale bit quantity of 8 bits, an intermediate gray-scale bit quantity of 10 bits and a target gray-scale bit quantity of 12 bits as an example, Table 3 schematically shows intermediate gray-scale values L_Z, first target gray-scale values L_H and second target gray-scale values L_L corresponding to gray-scale values 125-130. It should be noted that specific values of gray-scale values shown in Table 3 are only illustrative. In practical application, the specific values of the gray-scale values may be determined according to an actual application requirement, which are not limited herein.

TABLE 3

| Original gray-scale value | L_Z | L_H | L_L |
|---|---|---|---|
| 125 | 500 | 2693 | 619 |
| 126 | 504 | 2713 | 630 |
| 127 | 508 | 2734 | 641 |
| 128 | 512 | 2754 | 652 |
| 129 | 516 | 2774 | 665 |
| 130 | 520 | 2794 | 678 |

In the example of the present disclosure, the second lookup table includes first target gray-scale values and second target gray-scale values corresponding to sub-pixels with various colors. For example, the second lookup table includes a first target gray-scale value and a second target gray-scale value corresponding to a red sub-pixel corresponding to each original gray-scale value, a first target gray-scale value and a second target gray-scale value corresponding to a green sub-pixel corresponding to each original gray-scale value, and a first target gray-scale value and a second target gray-scale value corresponding to a blue sub-pixel corresponding to each original gray-scale value. For example, with the default gray-scale bit quantity of 8 bits, the intermediate gray-scale bit quantity of 10 bits and the target gray-scale bit quantity of 12 bits as an example, Table 4 schematically shows intermediate gray-scale values L_Z corresponding to gray-scale values 125-130, first target gray-scale values LR_H and second target gray-scale values LR_L of red sub-pixels corresponding to the gray-scale values, first target gray-scale values LG_H and second target gray-scale values LG_L of green sub-pixels corresponding to the gray-scale values, and first target gray-scale values LB_H and second target gray-scale values LB_L of blue sub-pixels corresponding to the gray-scale values. It should be noted that specific values of gray-scale values shown in Table 4 are only illustrative. In practical application, the specific values of the gray-scale values may be determined according to an actual application requirement, which are not limited herein.

TABLE 4

| Original gray-scale value | L_Z | LR_H | LG_H | LB_H | LR_L | LG_L | LB_L |
|---|---|---|---|---|---|---|---|
| 125 | 500 | 168 | 168 | 168 | 38 | 38 | 38 |
| 126 | 504 | 169 | 169 | 169 | 39 | 39 | 39 |
| 127 | 508 | 170 | 170 | 170 | 40 | 40 | 40 |
| 128 | 512 | 171 | 171 | 171 | 41 | 41 | 41 |
| 129 | 516 | 172 | 172 | 172 | 42 | 42 | 42 |
| 130 | 520 | 173 | 173 | 173 | 43 | 43 | 43 |

In the example of the present disclosure, the step that the current original gray-scale values with a default gray-scale bit quantity are converted into the first target gray-scale value and the second target gray-scale value with a target gray-scale bit quantity may include the step that the current intermediate gray-scale value corresponding to the current original gray-scale values is determined from the second pre-stored lookup table according to the current original gray-scale values. Then, the first target gray-scale value and the second target gray-scale value corresponding to the current intermediate gray-scale value are determined from the second lookup table according to the current intermediate gray-scale value. For example, with reference to Table 4, when the current original gray-scale value is a gray-scale value 127, the current intermediate gray-scale value may be determined to be a gray-scale value 508 by looking up the second lookup table. Then, according to the gray-scale value 508, it is determined that a first target gray-scale value corresponding to a red sub-pixel is a gray-scale value 2734, a second target gray-scale value corresponding to the red sub-pixel is a gray-scale value 641, a first target gray-scale value corresponding to a green sub-pixel is a gray-scale value 2734, a second target gray-scale value corresponding to the green sub-pixel is a gray-scale value 641, a first target gray-scale value corresponding to a blue sub-pixel is a gray-scale value 2734, and a second target gray-scale value corresponding to the blue sub-pixel is a gray-scale value 641. In this way, a data voltage corresponding to the gray-scale value 2734 may be input to the red sub-pixel in the first sub-pixel unit SPX-1, a data voltage corresponding to the gray-scale value 2734 may be input to the green sub-pixel in the first sub-pixel unit SPX-1, a data voltage corresponding to the gray-scale value 2734 may be input to the blue sub-pixel in the first sub-pixel unit SPX-1, a data voltage corresponding to the gray-scale value 641 may be input to the red sub-pixel in the second sub-pixel unit SPX-2, a data voltage corresponding to the gray-scale value 641 may be input to the green sub-pixel in the second sub-pixel unit SPX-2, and a data voltage corresponding to the gray-scale value 641 may be input to the blue sub-pixel in the second sub-pixel unit SPX-2.

For example, with reference to Table 4, with a current original gray-scale value of 127, a first target gray-scale value of 2734 and a second target gray-scale value of 641 as an example, as shown in FIG. 9, in a current display frame F_n, data voltages corresponding to the gray-scale value 2734 may be input to the red sub-pixels R11 and R22, the green sub-pixels G21 and G12, and the blue sub-pixels B11 and B22, respectively, such that brightness displayed by the sub-pixels may be brightness corresponding to the gray-scale value 2734. In addition, data voltages corresponding to the gray-scale value 641 may be input to the red sub-pixels R21 and R12, the green sub-pixels G11 and G22, and the blue sub-pixels B21 and B12, respectively, such that brightness displayed by the sub-pixels may be brightness corresponding to the gray-scale value 641. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. In addition, in a current display frame F_n+1, data voltages corresponding to the gray-scale value 641 may be input to the red sub-pixels R11 and R22, the green sub-pixels G21 and G12, and the blue sub-pixels B11 and B22, respectively, such that brightness displayed by the sub-pixels may be brightness corresponding to the gray-scale value 641. In addition, data voltages corresponding to the gray-scale value 2734 may be input to the red sub-pixels R21 and R12, the green sub-pixels G11 and G22, and the blue sub-pixels B21 and B12, respectively, such that brightness displayed by the sub-pixels may be brightness corresponding to the gray-scale value 2734. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. The brightness corresponding to the gray-scale value 170 is higher than that corresponding to the gray-scale value 127, and the brightness corresponding to the gray-scale value 40 is lower than that corresponding to the gray-scale value 127, such that two adjacent sub-pixels may achieve the brightness of the gray-scale value 127 through brightness mixing, mixed brightness displayed by the region may be the brightness of the gray-scale value 127, and then color cast may be improved.

An example of the present disclosure provides still some other drive methods for a display panel, which modify embodiments in the examples. Only differences between the example and the above examples will be described below, and similarities will not be repeated herein.

Figure 10:
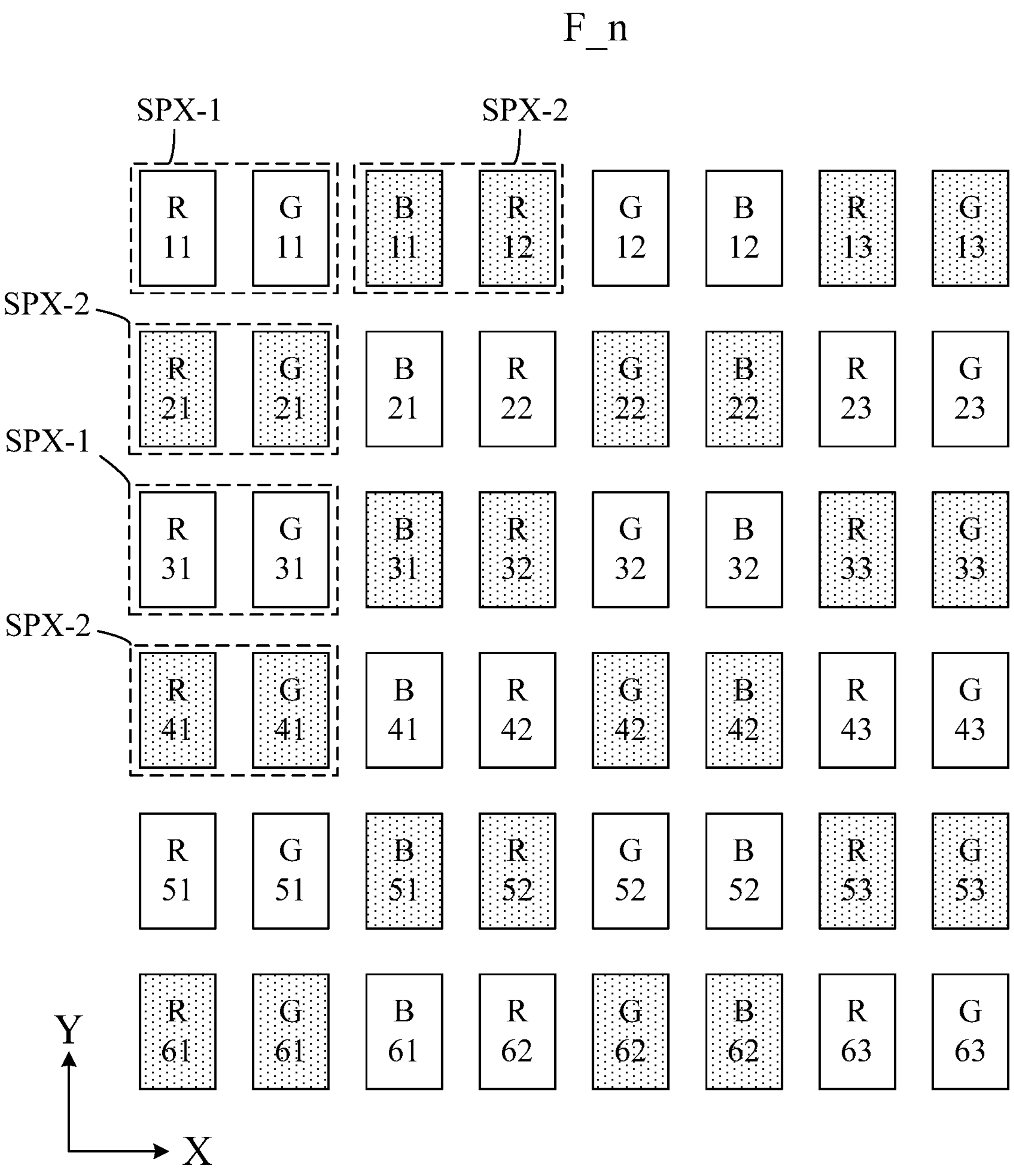
FIG. 10 shows a diagram of still some other structures of a display panel provided in an example of the present disclosure.
Figure 11:
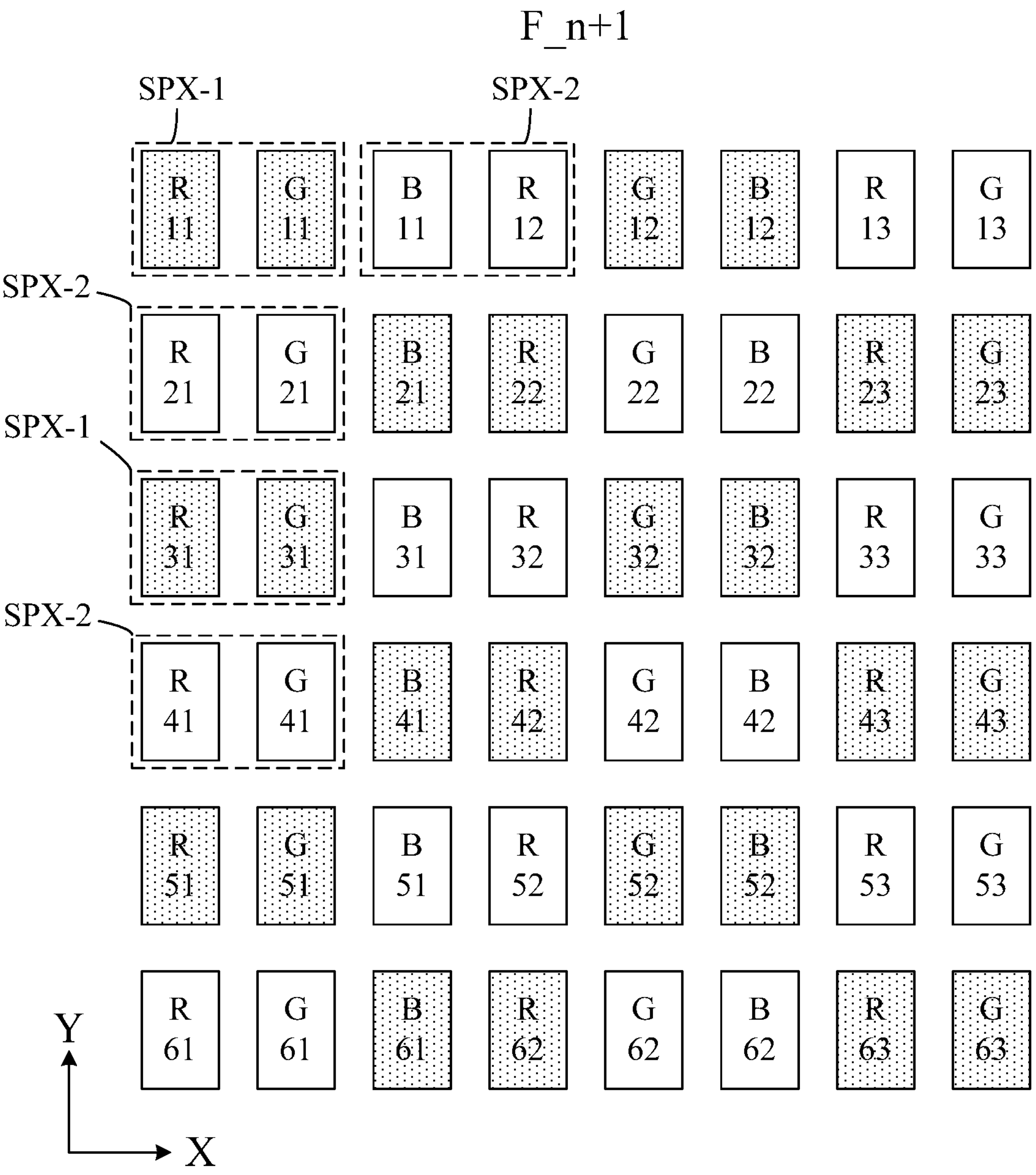
FIG. 11 shows a diagram of still some other structures of a display panel provided in an example of the present disclosure.

In the example of the present disclosure, in a row direction X and a column direction F of the sub-pixels, the sub-pixels are repeated in sequence of the first sub-pixel unit SPX-1 and the second sub-pixel unit SPX-2. For example, as shown in FIGS. 10 and 11, the first sub-pixel unit SPX-1 may include two sub-pixels adjacent in the row direction X, and the second sub-pixel unit SPX-2 may include two sub-pixels adjacent in the row direction X. For example, in a first row, a red sub-pixel R11 and a green sub-pixel G11 serve as one first sub-pixel unit SPX-1. A blue sub-pixel B11 and a red sub-pixel R12 serve as one second sub-pixel unit SPX-2. A green sub-pixel G12 and a blue sub-pixel B12 serve as one first sub-pixel unit SPX-1. A red sub-pixel R13 and a green sub-pixel G13 serve as one second sub-pixel unit SPX-2. In a second row, a red sub-pixel R21 and a green sub-pixel G21 serve as one second sub-pixel unit SPX-2. A blue sub-pixel B21 and a red sub-pixel R22 serve as one first sub-pixel unit SPX-1. A green sub-pixel G22 and a blue sub-pixel B22 serve as one second sub-pixel unit SPX-2. A red sub-pixel R23 and a green sub-pixel G23 serve as one third sub-pixel unit. Other rows may be analogized in turn, which will not be repeated herein.

For example, with reference to Table 4, with a current original gray-scale value of 127, a first target gray-scale value of 2734 and a second target gray-scale value of 641 as an example, as shown in FIGS. 10 and 11, in a current display frame F_n, data voltages corresponding to the gray-scale value 2734 may be input to the red sub-pixels R11, R31, R51, R22, R42, R62, R23, R43, and R63, the green sub-pixels G11, G31, G51, G12, G32, G52, G23, G43, and G63, and the blue sub-pixels B21, B41, B61, B12, B32, and B52, respectively, such that brightness displayed by the sub-pixels may be brightness corresponding to the gray-scale value 2734. In addition, data voltages corresponding to the gray-scale value 641 may be input to the red sub-pixels R21, R41, R61, R12, R32, R52, R13, R33, and R53, the green sub-pixels G21, G41, G61, G22, G42, G62, G13, G33, and G53, and the blue sub-pixels B11, B31, B51, B22, B42, and B62, respectively, such that brightness displayed by the sub-pixels may be brightness corresponding to the gray-scale value 641. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. In addition, in a current display frame F_n+1, data voltages corresponding to the gray-scale value 641 may be input to the red sub-pixels R11, R31, R51, R22, R42, R62, R23, R43, and R63, the green sub-pixels G11, G31, G51, G12, G32, G52, G23, G43, and G63, and the blue sub-pixels B21, B41, B61, B12, B32, and B52, respectively, such that brightness displayed by the sub-pixels may be brightness corresponding to the gray-scale value 641. In addition, data voltages corresponding to the gray-scale value 2734 may be input to the red sub-pixels R21, R41, R61, R12, R32, R52, R13, R33, and R53, the green sub-pixels G21, G41, G61, G22, G42, G62, G13, G33, and G53, and the blue sub-pixels B11, B31, B51, B22, B42, and B62, respectively, such that brightness displayed by the sub-pixels may be brightness corresponding to the gray-scale value 2734. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. The brightness corresponding to the gray-scale value 170 is higher than that corresponding to the gray-scale value 127, and the brightness corresponding to the gray-scale value 40 is lower than that corresponding to the gray-scale value 127, such that two adjacent sub-pixels may achieve the brightness of the gray-scale value 127 through brightness mixing, mixed brightness displayed by the region may be the brightness of the gray-scale value 127, and then color cast may be improved. Moreover, a vertical-strip problem may further be solved.

It should be noted that the first sub-pixel unit SPX-1 may also include three, four, five, or more sub-pixels adjacent in the row direction X, and the second sub-pixel unit SPX-2 may include three, four, five, or more sub-pixels adjacent in the row direction X, which is not limited herein.

An example of the present disclosure provides still some other drive methods for a display panel, which modify embodiments in the examples. Only differences between the example and the above examples will be described below, and similarities will not be repeated herein.

Figure 12:
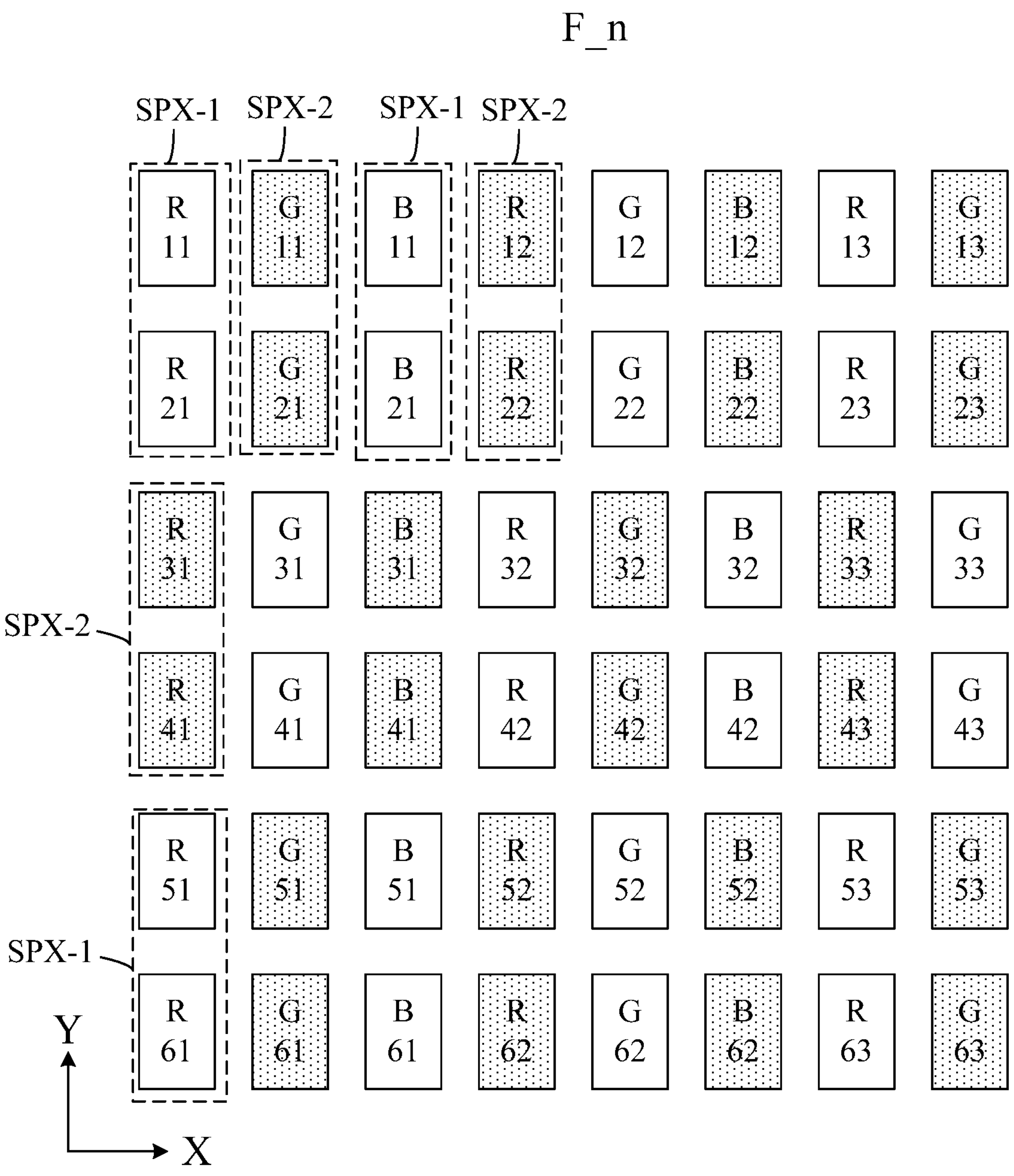
FIG. 12 shows a diagram of still some other structures of a display panel provided in an example of the present disclosure.
Figure 13:
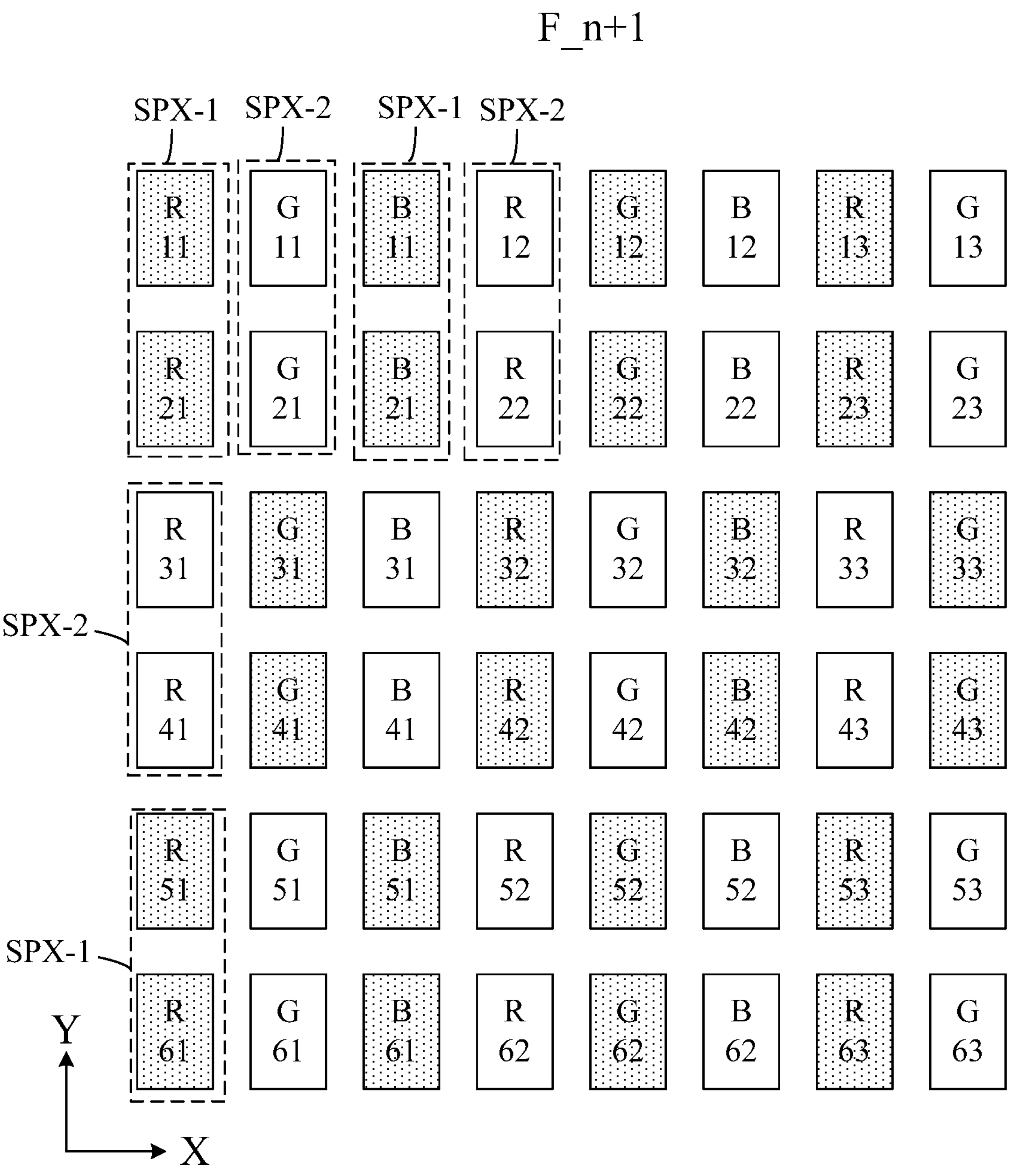
FIG. 13 shows a diagram of still some other structures of a display panel provided in an example of the present disclosure.

In the example of the present disclosure, in a row direction X and a column direction F of the sub-pixels, the sub-pixels are repeated in sequence of the first sub-pixel unit SPX-1 and the second sub-pixel unit SPX-2. For example, as shown in FIGS. 12 and 13, the first sub-pixel unit SPX-1 includes two sub-pixels adjacent in the column direction F, and the second sub-pixel unit SPX-2 includes two sub-pixels adjacent in the column direction F. For example, in a first column, red sub-pixels R11 and R21 serve as one first sub-pixel unit SPX-1, red sub-pixels R31 and R41 serve as one second sub-pixel unit SPX-2, and red sub-pixels R51 and R61 serve as one first sub-pixel unit SPX-1. In a second column, green sub-pixels G11 and G21 serve as one second sub-pixel unit SPX-2, green sub-pixels G31 and G41 serve as one first sub-pixel unit SPX-1, and green sub-pixels G51 and G61 serve as one second sub-pixel unit SPX-2. Other columns may be analogized in turn, which will not be repeated herein.

For example, with reference to Table 4, with a current original gray-scale value of 127, a first target gray-scale value of 2734 and a second target gray-scale value of 641 as an example, as shown in FIGS. 12 and 13, in a current display frame F_n, data voltages corresponding to the gray-scale value 2734 may be input to the red sub-pixels R11, R21, R51, R61, R32, R42, R13, R23, R53, and R63, the green sub-pixels G31, G41, G12, G22, G52, G62, G33, and G43, and the blue sub-pixels B11, B21, B51, B61, B32, and B42, respectively, such that brightness displayed by the sub-pixels may be brightness corresponding to the gray-scale value 2734. In addition, data voltages corresponding to the gray-scale value 641 may be input to the red sub-pixels R31, R41, R12, R22, R52, R62, R33, and R43, the green sub-pixels G11, G21, G51, G61, G32, G42, G13, G23, G53, and G63, and the blue sub-pixels B31, B41, B12, B52, and B62, respectively, such that brightness displayed by the sub-pixels may be brightness corresponding to the gray-scale value 641. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. In addition, in a current display frame F_n+1, data voltages corresponding to the gray-scale value 641 may be input to the red sub-pixels R11, R21, R51, R61, R32, R42, R13, R23, R53, and R63, the green sub-pixels G31, G41, G12, G22, G52, G62, G33, and G43, and the blue sub-pixels B11, B21, B51, B61, B32, and B42, respectively, such that brightness displayed by the sub-pixels may be brightness corresponding to the gray-scale value 641. In addition, data voltages corresponding to the gray-scale value 2734 may be input to the red sub-pixels R31, R41, R12, R22, R52, R62, R33, and R43, the green sub-pixels G11, G21, G51, G61, G32, G42, G13, G23, G53, and G63, and the blue sub-pixels B31, B41, B12, B52, and B62, respectively, such that brightness displayed by the sub-pixels may be brightness corresponding to the gray-scale value 2734. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. The brightness corresponding to the gray-scale value 170 is higher than that corresponding to the gray-scale value 127, and the brightness corresponding to the gray-scale value 40 is lower than that corresponding to the gray-scale value 127, such that two adjacent sub-pixels may achieve the brightness of the gray-scale value 127 through brightness mixing, mixed brightness displayed by the region may be the brightness of the gray-scale value 127, and then color cast may be improved. Moreover, a transverse-strip problem may further be solved.

It should be noted that the first sub-pixel unit SPX-1 may also include three, four, five, or more sub-pixels adjacent in the column direction F, and the second sub-pixel unit SPX-2 may include three, four, five, or more sub-pixels adjacent in the column direction F, which is not limited herein.

An example of the present disclosure provides still some other drive methods for a display panel, which modify embodiments in the examples. Only differences between the example and the above examples will be described below, and similarities will not be repeated herein.

Figure 14:
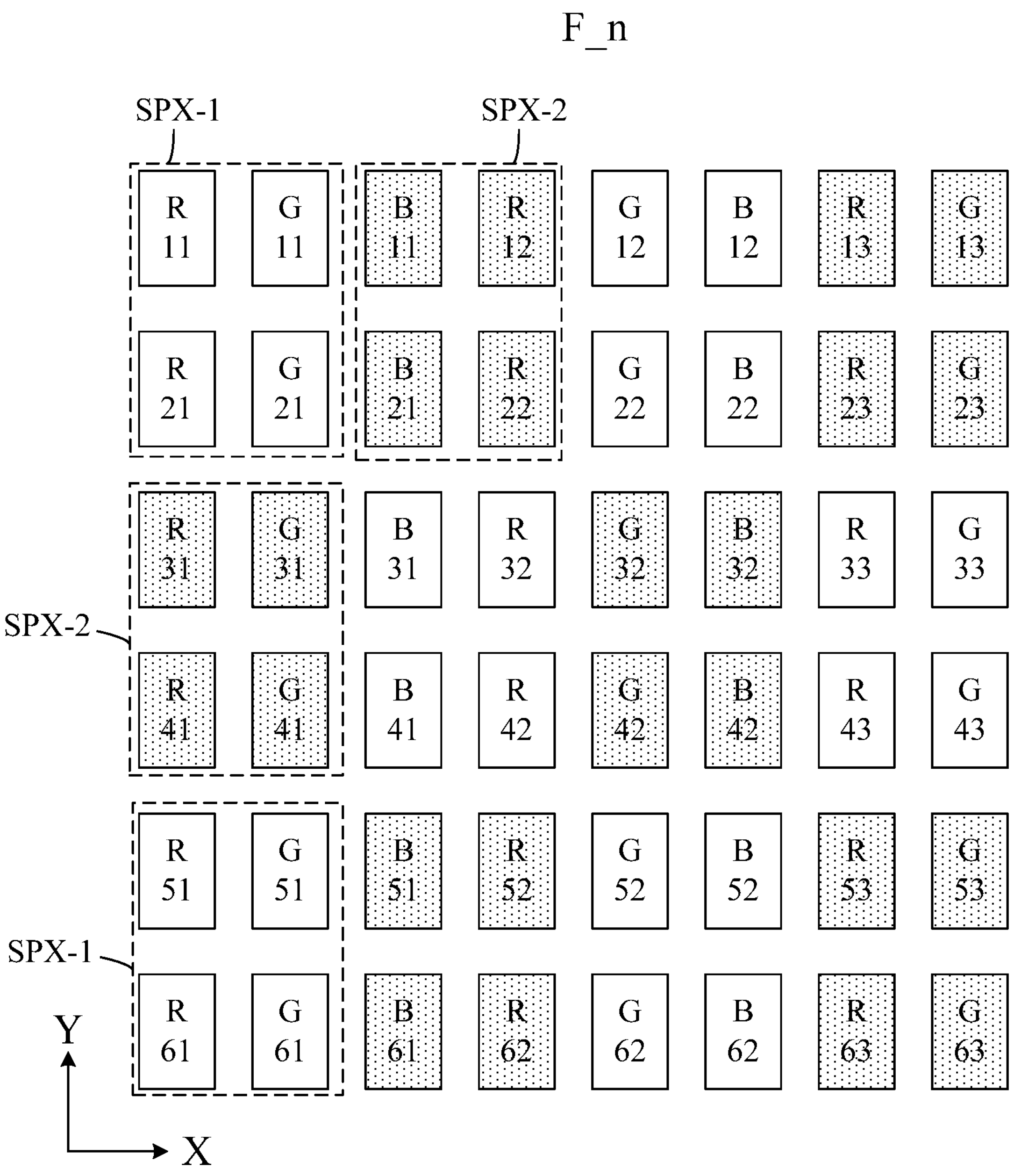
FIG. 14 shows a diagram of still some other structures of a display panel provided in an example of the present disclosure.
Figure 15:
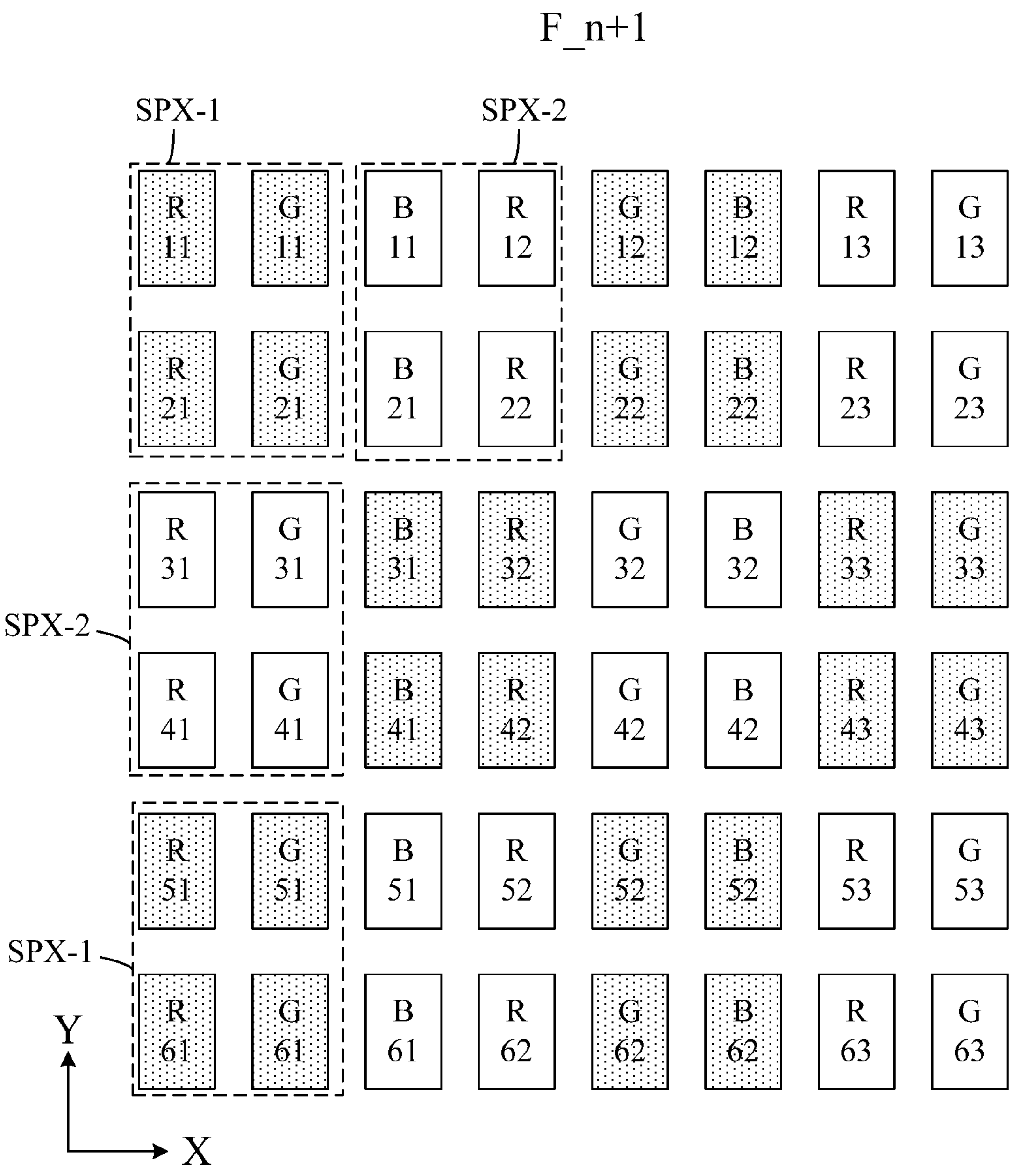
FIG. 15 shows a diagram of still some other structures of a display panel provided in an example of the present disclosure.

In the example of the present disclosure, in a row direction X and a column direction F of the sub-pixels, the sub-pixels are repeated in sequence of the first sub-pixel unit SPX-1 and the second sub-pixel unit SPX-2. For example, as shown in FIGS. 14 and 15, the first sub-pixel unit SPX-1 includes two rows and two columns of sub-pixels, and the second sub-pixel unit SPX-2 includes two rows and two columns of sub-pixels. For example, red sub-pixels R11 and R21 and green sub-pixels G11 and G21 may serve as one first sub-pixel unit SPX-1. Blue sub-pixels B11 and B21 and red sub-pixels R12 and R22 may serve as one second sub-pixel unit SPX-2. Green sub-pixels G12 and G22 and blue sub-pixels B12 and B22 may serve as one first sub-pixel unit SPX-1. Red sub-pixels R13 and R23 and green sub-pixels G13 and G23 may serve as one second sub-pixel unit SPX-2. Red sub-pixels R31 and R41 and green sub-pixels G31 and G41 may serve as one second sub-pixel unit SPX-2. Red sub-pixels R51 and R61 and green sub-pixels G51 and G61 may serve as one first sub-pixel unit SPX-1. Other rows may be analogized in turn, which will not be repeated herein.

For example, with reference to Table 4, with a current original gray-scale value of 127, a first target gray-scale value of 2734 and a second target gray-scale value of 641 as an example, as shown in FIGS. 14 and 15, in a current display frame F_n, data voltages corresponding to the gray-scale value 2734 may be input to the red sub-pixels R11, R21, R51, R61, R32, R42, R33, and R43, the green sub-pixels G11, G21, G51, G61, G12, G22, G52, G62, G33, and G43, and the blue sub-pixels B31, B12, B22, B52, and B62, respectively, such that brightness displayed by the sub-pixels may be brightness corresponding to the gray-scale value 2734. In addition, data voltages corresponding to the gray-scale value 641 may be input to the red sub-pixels R11, R21, R51, R61, R32, R42, R33, and R43, the green sub-pixels G11, G21, G51, G61, G12, G22, G52, G62, G33, and G43, and the blue sub-pixels B31, B12, B22, B52, and B62, respectively, such that brightness displayed by the sub-pixels may be brightness corresponding to the gray-scale value 641. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. In addition, in a current display frame F_n+1, data voltages corresponding to the gray-scale value 641 may be input to the red sub-pixels R11, R31, R51, R22, R42, R62, R23, R43, and R63, the green sub-pixels G11, G31, G51, G12, G32, G52, G23, G43, and G63, and the blue sub-pixels B21, B41, B61, B12, B32, and B52, respectively, such that brightness displayed by the sub-pixels may be brightness corresponding to the gray-scale value 641. In addition, data voltages corresponding to the gray-scale value 2734 may be input to the red sub-pixels R21, R41, R61, R12, R32, R52, R13, R33, and R53, the green sub-pixels G21, G41, G61, G22, G42, G62, G13, G33, and G53, and the blue sub-pixels B11, B31, B51, B22, B42, and B62, respectively, such that brightness displayed by the sub-pixels may be brightness corresponding to the gray-scale value 2734. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. The brightness corresponding to the gray-scale value 170 is higher than that corresponding to the gray-scale value 127, and the brightness corresponding to the gray-scale value 40 is lower than that corresponding to the gray-scale value 127, such that two adjacent sub-pixels may achieve the brightness of the gray-scale value 127 through brightness mixing, mixed brightness displayed by the region may be the brightness of the gray-scale value 127, and then color cast may be improved. Moreover, a large-grid problem may further be solved.

It should be noted that N may be 3, 4, 5, or other numerical values, and M may also be 3, 4, 5, or other numerical values, which are not limited herein.

An example of the present disclosure provides still some other drive methods for a display panel, which modify embodiments in the examples. Only differences between the example and the above examples will be described below, and similarities will not be repeated herein.

Figure 16:
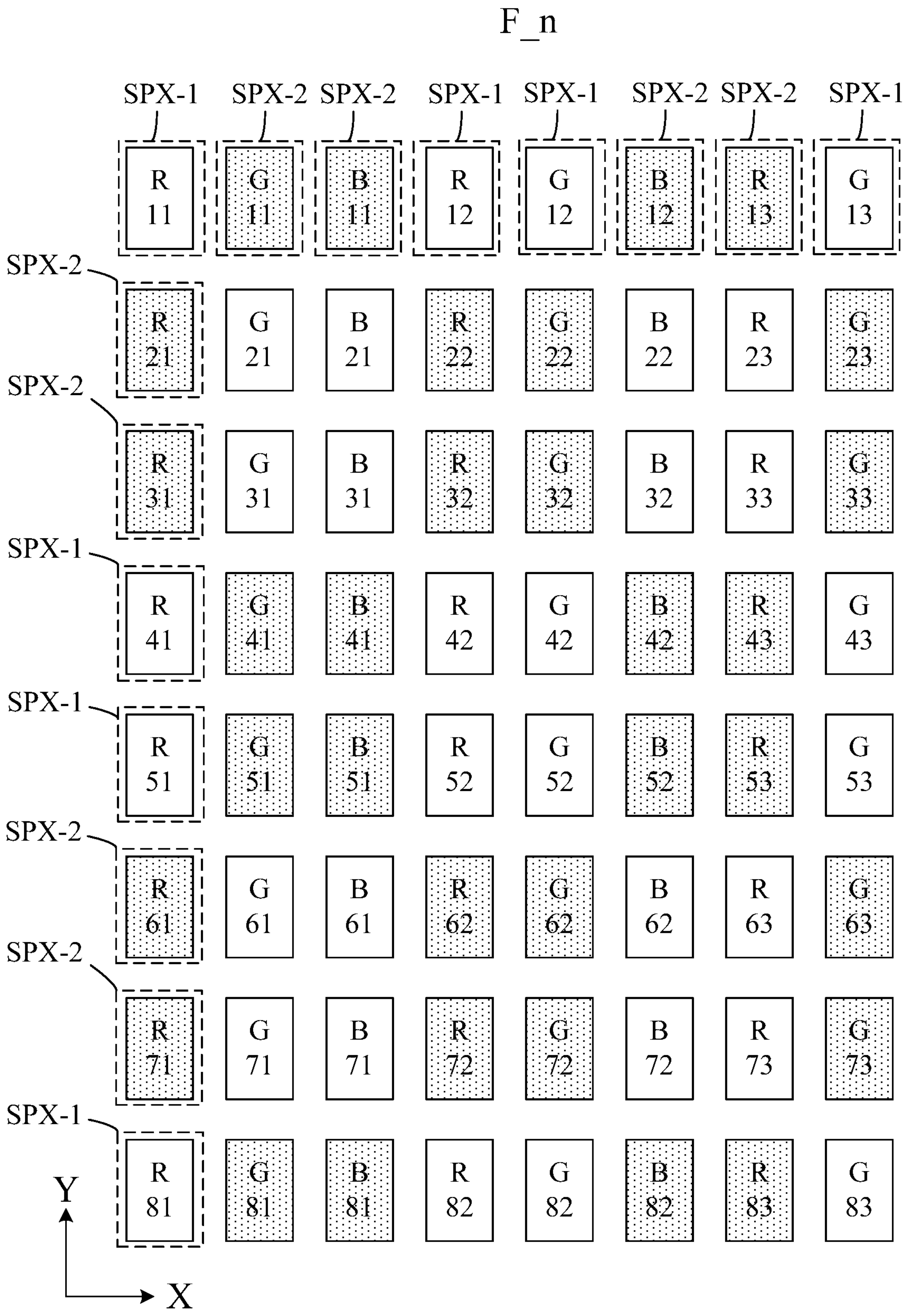
FIG. 16 shows a diagram of still some other structures of a display panel provided in an example of the present disclosure.
Figure 17:
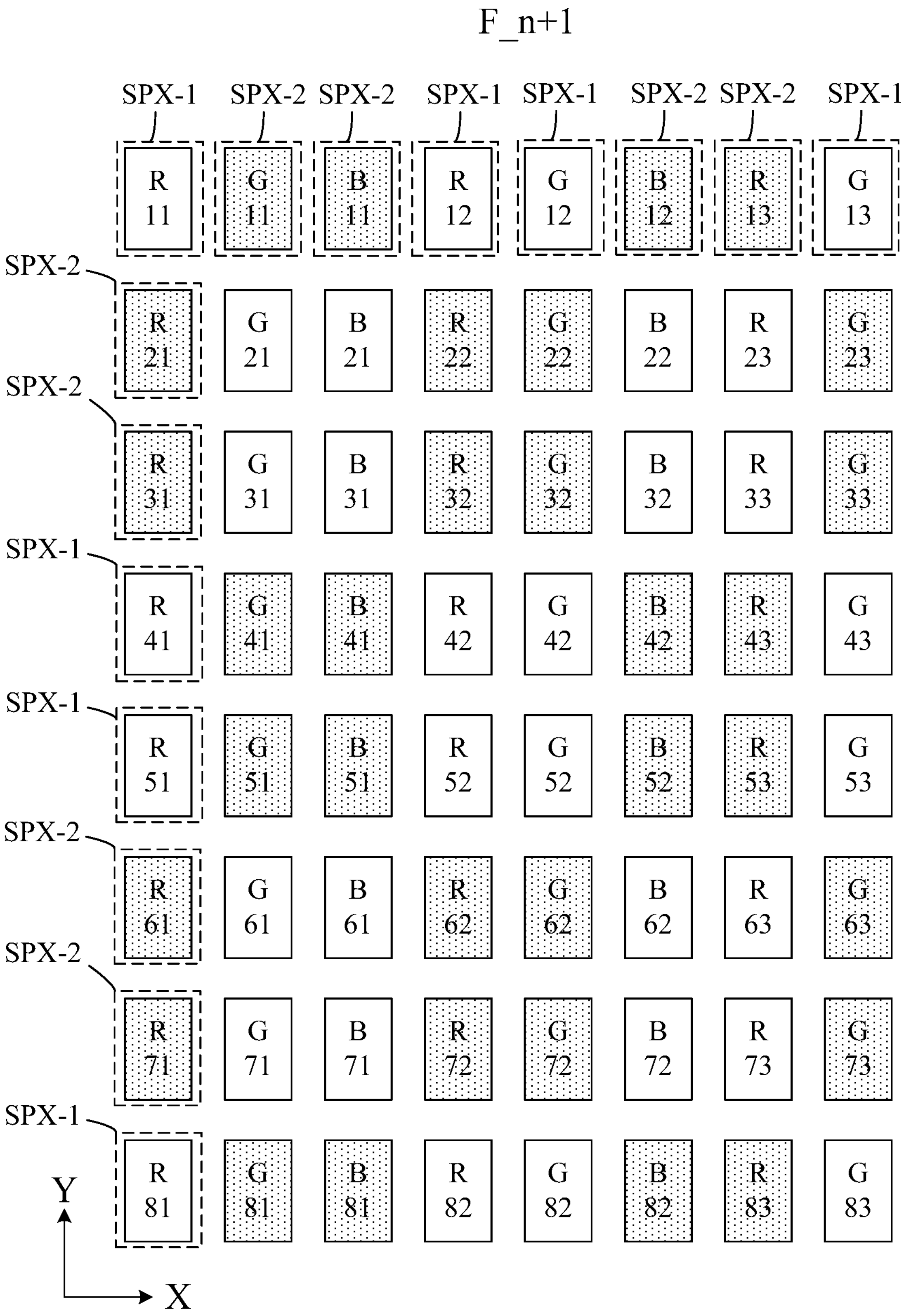
FIG. 17 shows a diagram of still some other structures of a display panel provided in an example of the present disclosure.

In the example of the present disclosure, in a row direction X and a column direction F of the sub-pixels, the second sub-pixel unit SPX-2, the sub-pixels are repeated in sequence of the first sub-pixel unit SPX-1, the first sub-pixel unit SPX-1, and the second sub-pixel unit SPX-2. For example, as shown in FIGS. 16 and 17, each of the first sub-pixel unit SPX-1 and the second sub-pixel unit SPX-2 may include one sub-pixel. For example, in a first row, a red sub-pixel R11 may serve as one first sub-pixel unit SPX-1, a green sub-pixel G11 may serve as one second sub-pixel unit SPX-2, a blue sub-pixel B11 may serve as one second sub-pixel unit SPX-2, a red sub-pixel R12 may serve as one first sub-pixel unit SPX-1, a green sub-pixel G12 may serve as one first sub-pixel unit SPX-1, a blue sub-pixel B12 may serve as one second sub-pixel unit SPX-2, a red sub-pixel R13 may serve as one second sub-pixel unit SPX-2, and a green sub-pixel G13 may serve as one second sub-pixel unit SPX-2. In addition, in a first column, a red sub-pixel R11 may serve as one first sub-pixel unit SPX-1, a red sub-pixel R21 may serve as one second sub-pixel unit SPX-2, a red sub-pixel R31 may serve as one second sub-pixel unit SPX-2, a red sub-pixel R41 may serve as one first sub-pixel unit SPX-1, the red sub-pixel R51 may serve as one first sub-pixel unit SPX-1, the red sub-pixel R61 may serve as one second sub-pixel unit SPX-2, the red sub-pixel R71 may serve as one second sub-pixel unit SPX-2, and the red sub-pixel R81 may serve as one first sub-pixel unit SPX-1. Other sub-pixels may be analogized in turn, which will not be repeated herein.

For example, with reference to Table 4, with a current original gray-scale value of 127, a first target gray-scale value of 2734 and a second target gray-scale value of 641 as an example, as shown in FIGS. 16 and 17, in a current display frame F_n, data voltages corresponding to the gray-scale value 2734 may be input to the red sub-pixels R11, R41, R51, R81, R12, R42, R52, R82, R23, R33, R63, and R73, the green sub-pixels G21, G31, G61, G71, G12, G42, G52, G82, G13, G43, G53, and G83, and the blue sub-pixels B21, B31, B61, B71, B22, B32, B62, and B72, respectively, such that brightness displayed by the sub-pixels may be brightness corresponding to the gray-scale value 2734. In addition, data voltages corresponding to the gray-scale value 641 may be input to the red sub-pixels R21, R31, R61, R71, R22, R32, R62, R72, R13, R43, R53, and R83, the green sub-pixels G11, G41, G51, G81, G22, G32, G62, G72, G23, G33, G63, and G73, and the blue sub-pixels B11, B41, B51, B81, B12, B42, B52, and B82, respectively, such that brightness displayed by the sub-pixels may be brightness corresponding to the gray-scale value 641. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. In addition, in a current display frame F_n+1, data voltages corresponding to the gray-scale value 641 may be input to the red sub-pixels R11, R41, R51, R81, R12, R42, R52, R82, R23, R33, R63, and R73, the green sub-pixels G21, G31, G61, G71, G12, G42, G52, G82, G13, G43, G53, and G83, and the blue sub-pixels B21, B31, B61, B71, B22, B32, B62, and B72, respectively, such that brightness displayed by the sub-pixels may be brightness corresponding to the gray-scale value 641. In addition, data voltages corresponding to the gray-scale value 2734 may be input to the red sub-pixels R21, R31, R61, R71, R22, R32, R62, R72, R13, R43, R53, and R83, the green sub-pixels G11, G41, G51, G81, G22, G32, G62, G72, G23, G33, G63, and G73, and the blue sub-pixels B11, B41, B51, B81, B12, B42, B52, and B82, respectively, such that brightness displayed by the sub-pixels may be brightness corresponding to the gray-scale value 2734. 2734/16 is about a gray-scale value 170 of 8 bits, and 641/16 is about a gray-scale value 40, such that display brightness of the sub-pixel with the input gray-scale value 2734 may be about brightness corresponding to the gray-scale value 170, and display brightness of the sub-pixel with the input gray-scale value 641 may be about brightness corresponding to the gray-scale value 40. The brightness corresponding to the gray-scale value 170 is higher than that corresponding to the gray-scale value 127, and the brightness corresponding to the gray-scale value 40 is lower than that corresponding to the gray-scale value 127, such that two adjacent sub-pixels may achieve the brightness of the gray-scale value 127 through brightness mixing, mixed brightness displayed by the region may be the brightness of the gray-scale value 127, and then color cast may be improved. Moreover, a vertical-strip problem may further be solved.

It should be noted that the first sub-pixel unit SPX-1 may also include two, three, four, five, or more sub-pixels adjacent in the row direction X. Alternatively, the first sub-pixel unit SPX-1 may also include two, three, four, five, or more sub-pixels adjacent in the column direction F. Alternatively, the first sub-pixel unit SPX-1 may also include N rows and M columns of sub-pixels, which is not limited herein.

It should be noted that the second sub-pixel unit SPX-2 may also include two, three, four, five, or more sub-pixels adjacent in the row direction X. Alternatively, the second sub-pixel unit SPX-2 may also include two, three, four, five, or more sub-pixels adjacent in the column direction F. Alternatively, the second sub-pixel unit SPX-2 may also include N rows and M columns of sub-pixels, which is not limited herein.

Those skilled in the art should understand that the examples of the present disclosure can provide methods, systems, or computer program products. Therefore, the present disclosure can employ full hardware examples, full software examples, or software and hardware combined examples. Moreover, the present disclosure can take the form of a computer program product implemented on one or more computer usable storage media (including, but not limited to, a disk memory, a compact disc read-only memory (CD-ROM), an optical memory, etc.) containing computer usable program codes.

The present disclosure is described with reference to flow diagrams and/or block diagrams of methods, devices (systems), and computer program products in the examples of the present disclosure. It should be understood that each flow and/or block in the flowcharts and/or block diagrams and combinations of the flows and/or blocks in the flowcharts and/or block diagrams may be implemented by computer program instructions. The computer program instructions may be provided for a processor of a general-purpose computer, a special-purpose computer, an embedded processor, or other programmable data processing devices, to produce a machine, such that instructions executed by the processor of the computer or other programmable data processing devices produce an apparatus used for implementing functions specified in one or more flows of each flowchart and/or one or more blocks of each block diagram.

The computer program instructions can also be stored in a computer-readable memory that is capable of guiding a computer or other programmable data processing devices to work in a specific manner, such that the instructions stored in the computer-readable memory produce an article of manufacture including an instruction apparatus, and the instruction apparatus implements functions specified in one or more flows of each flow diagram and/or one or more blocks in each block diagram.

The computer program instructions can be loaded onto a computer or other programmable data processing devices, such that a series of operations and steps are conducted on the computer or the other programmable devices, thereby generating computer-implemented processing. Therefore, the instructions executed on the computer or the other programmable device provide steps for implementing a specific function in one or more flows in the flow diagrams and/or in one or more blocks in the block diagrams.

Although the preferred examples of the present disclosure have been described, those skilled in the art can make additional changes and modifications to the examples once they learn the basic inventive concept. Therefore, the appended claims are intended to be interpreted as including the preferred examples and all changes and modifications falling within the scope of the present disclosure.

Apparently, those skilled in the art can make various modifications and variations to the examples of the present disclosure without departing from the spirit and scope of the examples of the present disclosure. In this way, if the modifications and variations of the examples of the present disclosure fall within the scope of the claims of the present disclosure and their equivalent technologies, the present disclosure is also intended to include these modifications and variations.

What is claimed is:

1. A drive method for a display panel, comprising:

in a condition that current original gray-scale values corresponding to sub-pixels in a same region are the same in a plurality of continuous display frames;

converting the current original gray-scale values into a first target gray-scale value and a second target gray-scale value;

wherein the first target gray-scale value is greater than each of the current original gray-scale values, and the second target gray-scale value is smaller than the current original gray-scale values;

in a current display frame of the plurality of continuous display frames;

controlling a data voltage corresponding to the first target gray-scale value to be input to a first sub-pixel unit in the region; and controlling a data voltage corresponding to the second target gray-scale value to be input to a second sub-pixel unit in the region;

wherein the first sub-pixel unit and the second sub-pixel unit are adjacent to each other; and each of the first sub-pixel unit and the second sub-pixel unit comprises at least one sub-pixel; and in a next display frame of the plurality of continuous display frames;

controlling the data voltage corresponding to the second target gray-scale value to be input to the first sub-pixel unit in the region; and controlling the data voltage corresponding to the first target gray-scale value to be input to the second sub-pixel unit in the region.

2. The drive method for the display panel according to claim 1, wherein in a row direction and a column direction of sub-pixels, the first sub-pixel unit and the second sub-pixel unit are sequentially arranged in a repeating cycle; or in the row direction and the column direction of sub-pixels, the second sub-pixel unit, the first sub-pixel unit, the first sub-pixel unit, and the second sub-pixel unit are sequentially arranged in a repeating cycle.

3. The drive method for the display panel according to claim 2, wherein the first sub-pixel unit comprises at least two sub-pixels adjacent in the row direction; and the second sub-pixel unit comprises at least two sub-pixels adjacent in the row direction.

4. The drive method for the display panel according to claim 2, wherein the first sub-pixel unit comprises at least two sub-pixels adjacent in the column direction; and the second sub-pixel unit comprises at least two sub-pixels adjacent in the column direction.

5. The drive method for the display panel according to claim 2, wherein the first sub-pixel unit comprises N rows and M columns of sub-pixels, wherein N is an integer greater than 0, and M is an integer greater than 0; and the second sub-pixel unit comprises N rows and M columns of sub-pixels.

6. The drive method for the display panel according to claim 1, wherein in the plurality of continuous display frames, polarity corresponding to a data voltage input to each sub-pixel in the first sub-pixel unit and the second sub-pixel unit is controlled to be reversed once after an even quantity of display frames.

7. The drive method for the display panel according to claim 1, wherein the converting the current original gray-scale values into the first target gray-scale value and the second target gray-scale value comprises:

converting the current original gray-scale values with a default gray-scale bit quantity into the first target gray-scale value and the second target gray-scale value each with a target gray-scale bit quantity, wherein the target gray-scale bit quantity is not smaller than the default gray-scale bit quantity.

8. The drive method for the display panel according to claim 7, wherein the converting the current original gray-scale values with the default gray-scale bit quantity into the first target gray-scale value and the second target gray-scale value each with the target gray-scale bit quantity comprises:

determining the first target gray-scale value and the second target gray-scale value corresponding to the current original gray-scale values from a first pre-stored lookup table according to the current original gray-scale values;

wherein the first lookup table comprises: a plurality of different original gray-scale values corresponding to the default gray-scale bit quantity, and a plurality of first different target gray-scale values and a plurality of second different target gray-scale values corresponding to the target gray-scale bit quantity; and in the first lookup table, one original gray-scale value corresponds to one first target gray-scale value and one second target gray-scale value.

9. The drive method for the display panel according to claim 8, wherein the display panel comprises multiple sub-pixels with different colors; and the first lookup table comprises first target gray-scale values and second target gray-scale values corresponding to the multiple sub-pixels with different colors.

10. The drive method for the display panel according to claim 7, wherein the converting the current original gray-scale values with the default gray-scale bit quantity into the first target gray-scale value and the second target gray-scale value each with the target gray-scale bit quantity comprises:

determining a current intermediate gray-scale value corresponding to the current original gray-scale values from a second pre-stored lookup table according to the current original gray-scale values, wherein an intermediate gray-scale bit quantity of the current intermediate gray-scale value is greater than the default gray-scale bit quantity, and the intermediate gray-scale bit quantity is smaller than the target gray-scale bit quantity; and determining the first target gray-scale value and the second target gray-scale value corresponding to the current intermediate gray-scale value from the second lookup table according to the current intermediate gray-scale value;

wherein the second lookup table comprises: a plurality of different original gray-scale values corresponding to the default gray-scale bit quantity, a plurality of different intermediate gray-scale values corresponding to the intermediate gray-scale bit quantity, and a plurality of first different target gray-scale values and a plurality of second different target gray-scale values corresponding to the target gray-scale bit quantity; and in the second lookup table, one original gray-scale value corresponds to one intermediate gray-scale value, and one intermediate gray-scale value corresponds to one first target gray-scale value and one second target gray-scale value.

11. The drive method for the display panel according to claim 10, wherein the display panel comprises multiple sub-pixels with different colors; and the second lookup table comprises first target gray-scale values and second target gray-scale values corresponding to the multiple sub-pixels with different colors.

12. The drive method for the display panel according to claim 1, wherein before the converting the current original gray-scale values into a first target gray-scale value and a second target gray-scale value, the drive method further comprises:

receiving original display data of each sub-pixel in the plurality of continuous display frames; and determining the current original gray-scale value of each sub-pixel in the plurality of continuous display frames according to the original display data of each sub-pixel in the plurality of continuous display frames.

13. A display apparatus, comprising:

a display panel, comprising a source drive circuit; and a timing controller, configured to:

convert, in a condition that current original gray-scale values corresponding to sub-pixels in a same region are the same in a plurality of continuous display frames, the current original gray-scale values into a first target gray-scale value and a second target gray-scale value; and output the first target gray-scale value and the second target gray-scale value to the source drive circuit;

wherein the first target gray-scale value is greater than each of the current original gray-scale values, and the second target gray-scale value is smaller than the current original gray-scale values;

wherein the source drive circuit is configured to:

in a current display frame of the plurality of continuous display frames;

control a data voltage corresponding to the first target gray-scale value to be input to a first sub-pixel unit in the region; and control a data voltage corresponding to the second target gray-scale value to be input to a second sub-pixel unit in the region; and in a next display frame of the plurality of continuous display frames;

control the data voltage corresponding to the second target gray-scale value to be input to the first sub-pixel unit in the region; and control the data voltage corresponding to the first target gray-scale value to be input to the second sub-pixel unit in the region;

wherein the first sub-pixel unit and the second sub-pixel unit are adjacent to each other; and each of the first sub-pixel unit and the second sub-pixel unit comprises at least one sub-pixel.

14. The display apparatus according to claim 13, wherein the timing controller is stored with a first lookup table;

wherein the first lookup table comprises: a plurality of different original gray-scale values corresponding to a default gray-scale bit quantity, and a plurality of first different target gray-scale values and a plurality of second different target gray-scale values corresponding to a target gray-scale bit quantity; and in the first lookup table, one original gray-scale value corresponds to one first target gray-scale value and one second target gray-scale value.

15. The display apparatus according to claim 13, wherein the timing controller is stored with a second lookup table;

wherein the second lookup table comprises: a plurality of different original gray-scale values corresponding to a default gray-scale bit quantity, a plurality of different intermediate gray-scale values corresponding to an intermediate gray-scale bit quantity, and a plurality of first different target gray-scale values and a plurality of second different target gray-scale values each corresponding to a target gray-scale bit quantity; and in the second lookup table, one original gray-scale value corresponds to one intermediate gray-scale value, and one intermediate gray-scale value corresponds to one first target gray-scale value and one second target gray-scale value.

16. The display apparatus according to claim 13, wherein the display panel comprises a plurality of sub-pixels; each of the plurality of sub-pixel comprises a transistor and a pixel electrode; and the pixel electrode comprises: a first edge conductive part and a second edge conductive part that are arranged at an interval in a first direction, and a main conductive part at least partially between the first edge conductive part and the second edge conductive part, wherein the main conductive part is connected to the first edge conductive part and the second edge conductive part separately, the main conductive part comprises at least one first group of sub-conductive parts and at least one second group of sub-conductive parts, and the first group of sub-conductive parts and the second group of sub-conductive parts are arranged alternately in the first direction;

wherein the first group of sub-conductive parts comprises a first connection strip, and the first connection strip extends in the first direction and has a first face and a second face opposite each other in a second direction; and the first group of sub-conductive parts has a first slit at one side of the first face away from the second face, and one end of the first slit away from the first connection strip is an open end; and the second group of sub-conductive parts comprises a second connection strip at one side of the first slit away from the first connection strip and connected to the first group of sub-conductive parts, the second connection strip extends in the first direction and has a third face and a fourth face opposite each other in the second direction, and the third face is at one side of the fourth face close to the first face; and the second group of sub-conductive parts has a second slit located at one side of the third face away from the fourth face, and one end of the second slit away from the second connection strip is an open end.

17. The display apparatus according to claim 16, wherein in two adjacent sub-pixels in a row direction or a column direction, a first edge conductive part in a first sub-pixel of the two adjacent sub-pixels is arranged close to the transistor in the first sub-pixel, and a second edge conductive part in the first sub-pixel is arranged away from the transistor in the first sub-pixel; and the second connection strip in the first sub-pixel is close to a second sub-pixel of the two adjacent sub-pixels, and the first connection strip in the first sub-pixel is away from the second sub-pixel; and a first edge conductive part in the second sub-pixel is arranged away from the transistor in the second sub-pixel, and a second edge conductive part in the second sub-pixel is arranged close to the transistor in the second sub-pixel; and the second connection strip in the second sub-pixel is away from the first sub-pixel of the two adjacent sub-pixels, and the first connection strip in the second sub-pixel is close to the first sub-pixel.

18. The display apparatus according to claim 17, wherein a quantity of second electrode strips in the first sub-pixel connected to the second connection strip in the first sub-pixel is different from a quantity of second electrode strips in the second sub-pixel connected to the second connection strip in the second sub-pixel; and/or a quantity of first electrode strips in the first sub-pixel connected to the first connection strip in the first sub-pixel is different from a quantity of first electrode strips the second sub-pixel connected to the first connection strip in the second sub-pixel.

19. The display apparatus according to claim 18, wherein in a same sub-pixel, the first connection strip is connected to the second connection strip by means of an adapter; and the adapter has a hollowed-out region.

20. The display apparatus according to claim 19, wherein the display panel comprises a plurality of common electrodes; a row of sub-pixels are provided with one common electrode;

the display panel further comprises a plurality of bridging parts; and two adjacent common electrodes are electrically connected to each other by means of at least one bridging part.

* * * * *